US012128693B2

(12) United States Patent
Igarashi et al.

(10) Patent No.: US 12,128,693 B2
(45) Date of Patent: Oct. 29, 2024

(54) LIQUID DISCHARGE APPARATUS

(71) Applicant: BROTHER KOGYO KABUSHIKI KAISHA, Nagoya (JP)

(72) Inventors: Akinori Igarashi, Kasugai (JP); Masataka Kamiya, Owariasahi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/463,504

(22) Filed: Sep. 8, 2023

(65) Prior Publication Data

US 2024/0100867 A1 Mar. 28, 2024

Related U.S. Application Data

(63) Continuation of application No. 17/161,161, filed on Jan. 28, 2021, now Pat. No. 11,787,209, which is a (Continued)

(30) Foreign Application Priority Data

Apr. 8, 2014 (JP) ................................ 2014-079370

(51) Int. Cl.
*B41J 25/00* (2006.01)
*B41J 2/145* (2006.01)
(Continued)

(52) U.S. Cl.
CPC ............ *B41J 25/006* (2013.01); *B41J 2/145* (2013.01); *B41J 2/17503* (2013.01); (Continued)

(58) Field of Classification Search
CPC .... B41J 2/175; B41J 2/17523; B41J 2/16508; B65D 83/00; B01D 21/10
See application file for complete search history.

(56) References Cited

U.S. PATENT DOCUMENTS

| | | | |
|---|---|---|---|
| 5,619,237 | A | 4/1997 | Inoue et al. |
| 5,686,947 | A | 11/1997 | Murray et al. |

(Continued)

FOREIGN PATENT DOCUMENTS

| | | | |
|---|---|---|---|
| CN | 120788 | A | 3/1999 |
| CN | 1288818 | A | 3/2001 |

(Continued)

OTHER PUBLICATIONS

Office Action (Notice of Reasons of Rejection) issued in related Japanese Patent Application No. 2018-244248, Sep. 3, 2019.

(Continued)

*Primary Examiner* — John Zimmermann

(74) *Attorney, Agent, or Firm* — Merchant & Gould P.C.

(57) ABSTRACT

There is provided a tank including a liquid storage chamber and an outlet. The liquid storage chamber includes a base portion and a protruding portion, the base portion includes a first lateral wall and a second lateral wall which faces the first lateral wall in a left-right direction, the protruding portion protrudes from the second lateral wall in a direction away from the first lateral wall in the left-right direction, and the left-right direction is defined based on a usable posture in which the tank is disposed such that a lower surface of the liquid storage chamber is located below an upper surface of the liquid storage chamber. A distance between the outlet and the second lateral wall in the left-right direction is smaller than a distance between the outlet and the first lateral wall in the left-right direction.

7 Claims, 15 Drawing Sheets

Related U.S. Application Data continuation of application No. 16/544,200, filed on Aug. 19, 2019, now Pat. No. 10,906,339, which is a continuation of application No. 15/348,248, filed on Nov. 10, 2016, now Pat. No. 10,384,480, which is a continuation of application No. 14/666,919, filed on Mar. 24, 2015, now Pat. No. 9,505,222.

(51) Int. Cl.
*B41J 2/175* (2006.01)
*B41J 29/02* (2006.01)

(52) U.S. Cl.
CPC ......... *B41J 2/17513* (2013.01); *B41J 2/1752* (2013.01); *B41J 2/1753* (2013.01); *B41J 29/02* (2013.01); *B41J 29/023* (2013.01)

(56) References Cited

U.S. PATENT DOCUMENTS

| | | | |
|---|---|---|---|
| 6,270,207 | B1 * | 8/2001 | Sasaki .................. B41J 2/17566 347/86 |
| 6,336,709 | B1 | 1/2002 | Inoue et al. |
| 6,361,158 | B1 | 3/2002 | Inoue et al. |
| 6,378,971 | B1 | 4/2002 | Tamura et al. |
| 6,511,167 | B1 | 1/2003 | Kitabatake et al. |
| 6,565,197 | B1 | 5/2003 | Murray et al. |
| 7,380,922 | B2 | 6/2008 | Sakurai |
| 7,416,291 | B1 | 8/2008 | Hattori et al. |
| 7,419,254 | B1 | 9/2008 | Hattori et al. |
| 9,457,581 | B2 | 10/2016 | Igarashi |
| 2001/0024225 | A1 | 9/2001 | Ishizawa et al. |
| 2002/0024543 | A1 | 2/2002 | Kimura et al. |
| 2002/0071011 | A1 | 6/2002 | Hayashi et al. |
| 2002/0089576 | A1 | 7/2002 | Ishizawa et al. |
| 2002/0093556 | A1 | 7/2002 | Ishizawa et al. |
| 2002/0118248 | A1 | 8/2002 | Inoue et al. |
| 2002/0130917 | A1 | 9/2002 | Mitsui et al. |
| 2002/0196312 | A1 | 12/2002 | Ishizawa et al. |
| 2003/0001934 | A1 | 1/2003 | Kitabatake et al. |
| 2003/0071874 | A1 | 4/2003 | Ishizawa et al. |
| 2003/0117468 | A1 | 6/2003 | Inoue et al. |
| 2003/0218660 | A1 | 11/2003 | Matsumoto et al. |
| 2004/0165044 | A1 | 8/2004 | Yamada |
| 2005/0083382 | A1 | 4/2005 | Shiho |
| 2005/0179750 | A1 | 8/2005 | Hayasaki et al. |
| 2005/0219303 | A1 | 10/2005 | Matsumoto et al. |
| 2006/0028517 | A1 | 2/2006 | Ishizawa et al. |
| 2006/0044371 | A1 | 3/2006 | Inoue et al. |
| 2006/0256169 | A1 | 11/2006 | Kobayashi et al. |
| 2007/0103520 | A1 | 5/2007 | Wu |
| 2007/0195140 | A1 | 8/2007 | Ishizawa et al. |
| 2007/0279462 | A1 | 12/2007 | Ishizawa et al. |
| 2008/0180496 | A1 | 7/2008 | Hattori et al. |
| 2008/0180497 | A1 | 7/2008 | Hattori et al. |
| 2008/0180498 | A1 | 7/2008 | Hattori et al. |
| 2008/0180499 | A1 | 7/2008 | Sugahara et al. |
| 2008/0239033 | A1 | 10/2008 | Hattori |
| 2008/0239035 | A1 | 10/2008 | Hattori et al. |
| 2008/0259144 | A1 | 10/2008 | Inoue et al. |
| 2009/0009569 | A1 | 1/2009 | Sasaki |
| 2009/0058959 | A1 | 3/2009 | Hattori |
| 2009/0073199 | A1 | 3/2009 | Sasaki et al. |
| 2009/0079805 | A1 | 3/2009 | Hattori |
| 2009/0237475 | A1 | 9/2009 | Ishizawa |
| 2010/0053279 | A1 | 3/2010 | Tamaki |
| 2010/0066796 | A1 | 3/2010 | Yanagi et al. |
| 2010/0225716 | A1 | 9/2010 | Hayakawa et al. |
| 2010/0265306 | A1 | 10/2010 | Inoue et al. |
| 2010/0283821 | A1 | 11/2010 | Ishizawa et al. |
| 2011/0242158 | A1 | 10/2011 | Takata et al. |
| 2012/0038719 | A1 | 2/2012 | Shimizu et al. |
| 2012/0050359 | A1 | 3/2012 | Koganehira et al. |
| 2012/0125481 | A1 | 5/2012 | Matsumoto et al. |
| 2013/0169720 | A1 | 7/2013 | Nakamura et al. |
| 2014/0043408 | A1 | 2/2014 | Kudo et al. |
| 2014/0055538 | A1 | 2/2014 | Ishizawa et al. |
| 2014/0063148 | A1 | 3/2014 | Iwamuro et al. |
| 2014/0063150 | A1 | 3/2014 | Miyazaki et al. |
| 2014/0104349 | A1 | 4/2014 | Kimura et al. |
| 2014/0375731 | A1 | 12/2014 | Miyazaki et al. |
| 2015/0109378 | A1 | 4/2015 | Koike et al. |
| 2015/0174907 | A1 | 6/2015 | Kimura et al. |
| 2015/0283815 | A1 | 10/2015 | Igarashi |
| 2015/0306882 | A1 | 10/2015 | Kudo et al. |
| 2016/0023469 | A1 | 1/2016 | Adachi et al. |
| 2016/0159099 | A1 | 6/2016 | Kudo et al. |
| 2017/0368832 | A1 | 12/2017 | Kudo et al. |
| 2018/0043695 | A1 | 2/2018 | Kawate |
| 2018/0111382 | A1 | 4/2018 | Kawagoe et al. |

FOREIGN PATENT DOCUMENTS

| | | | |
|---|---|---|---|
| CN | 1931586 | A | 3/2007 |
| CN | 201070874 | Y | 6/2008 |
| CN | 101544125 | | 9/2009 |
| CN | 101670706 | A | 3/2010 |
| CN | 202412915 | U | 9/2012 |
| CN | 203198406 | U | 9/2013 |
| CN | 103568581 | A | 2/2014 |
| JP | H11-504874 | A | 5/1999 |
| JP | 2001-199084 | A | 7/2001 |
| JP | 2002-264363 | A | 9/2002 |
| JP | 2006-142484 | A | 6/2006 |
| JP | 2008-183783 | A | 8/2008 |
| JP | 2010-030143 | A | 2/2010 |
| JP | 2010-234566 | A | 10/2010 |
| JP | 2011-16230 | A | 1/2011 |
| JP | 2014-046567 | A | 3/2014 |
| JP | 2014-046624 | A | 3/2014 |
| JP | 2014-046626 | A | 3/2014 |

OTHER PUBLICATIONS

Non-Final Office Action issued in earlier U.S. Appl. No. 16/544,200 on Jan. 3, 2020.
Final Office Action issued in earlier U.S. Appl. No. 16/544,200 on Jun. 8, 2020.
Notice of Allowance issued in earlier U.S. Appl. No. 16/544,200 on Sep. 30, 2020.
Non-Final Office Action issued in parent U.S. Appl. No. 17/161,161 on Jun. 13, 2022.
Final Office Action issued in parent U.S. Appl. No. 17/161,161 on Sep. 28, 2022.
Notice of Allowance issued in parent U.S. Appl. No. 17/161,161 on Feb. 15, 2023.
Notice of Allowance issued in parent U.S. Appl. No. 17/161,161 on Jun. 15, 2023.
Office Action issued in related Japanese Patent Application No. 2014-079370, Oct. 2, 2018.
Notice of Reasons for Rejection issued in related Japanese Patent Application No. 2014-079370, May 22, 2018.
Notice of Reasons for Rejection issued in related Japanese Patent Application No. 2014-079370, Jan. 9, 2018.
Office Action issued in related Chinese patent application 201510128599.1, dated Jul. 25, 2016.
Chinese Office Action from Corresponding Chinese Patent Application No. 201510128598.7, mailed Jun. 3, 2016 (with English Translation.
Notice of Allowance issued in related U.S. Appl. No. 14/666,850, mailed Aug. 4, 2015.
Related U.S. Appl. No. 14/666,850, as filed on Mar. 24, 2015.

* cited by examiner

LIQUID DISCHARGE APPARATUS

REFERENCE TO RELATED APPLICATIONS

The present application is a continuation of U.S. patent application Ser. No. 17/161,161, filed on Jan. 28, 2021, a continuation of U.S. patent application Ser. No. 16/544,200, filed on Aug. 19, 2019, now U.S. Pat. No. 10,906,339, which is a continuation of U.S. patent application Ser. No. 15/348,248 filed on Nov. 10, 2016, now U.S. Pat. No. 10,384,480, which is a continuation of U.S. patent application Ser. No. 14/666,919 filed on Mar. 24, 2015, now U.S. Pat. No. 9,505,222, and further claims priority from Japanese Patent Application No. 2014-079370 filed on Apr. 8, 2014, the disclosures of all of which are incorporated herein by reference in their entirety.

BACKGROUND ART

A printer (an example of a liquid discharge apparatus) which includes a large capacity tank that is refillable with ink, and a recording head which is configured to record an image onto recording paper by jetting the ink stored in the tank through nozzles, has hitherto been known. Moreover, printers in recent years have been made to be small-sized, in view of reduction of installing space or ease of carrying.

DESCRIPTION

However, when a printer is tilted at the time of carrying, there is a possibility that an ink in a tank is supplied excessively to a recording head and is leaked through a nozzle. Even when a nozzle surface of the recording head is capped for suppressing the leakage of ink, the ink that is outflowed to a cap is wasted. The abovementioned issue is particularly remarkable in a printer that includes a large-capacity tank.

The present teaching has been made in view of the abovementioned circumstance, and an object of the present teaching is to provide a liquid discharge apparatus in which, the liquid is suppressed from being leaked through a nozzle with a change in a posture of the liquid discharge apparatus.

According to a first aspect of the present teaching, there is provided a tank, including: a liquid storage chamber configured to store a liquid; and an outlet configured to flow out the liquid stored in the liquid storage chamber. The liquid storage chamber includes a base portion and a protruding portion, the base portion includes a first lateral wall and a second lateral wall which faces the first lateral wall in a left-right direction, the protruding portion protrudes from the second lateral wall of the base portion in a direction away from the first lateral wall in the left-right direction, and the left-right direction is defined based on a usable posture in which the tank is disposed such that a lower surface of the liquid storage chamber is located below an upper surface of the liquid storage chamber. A distance between the outlet and the second lateral wall in the left-right direction is smaller than a distance between the outlet and the first lateral wall in the left-right direction.

FIG. 1A is an external perspective view of a multi function peripheral 10, showing a cover 70 in a closed state, and FIG. 1B is an external perspective view of the multi function peripheral 10 showing the cover 70 in an open state.

Figure 13C:
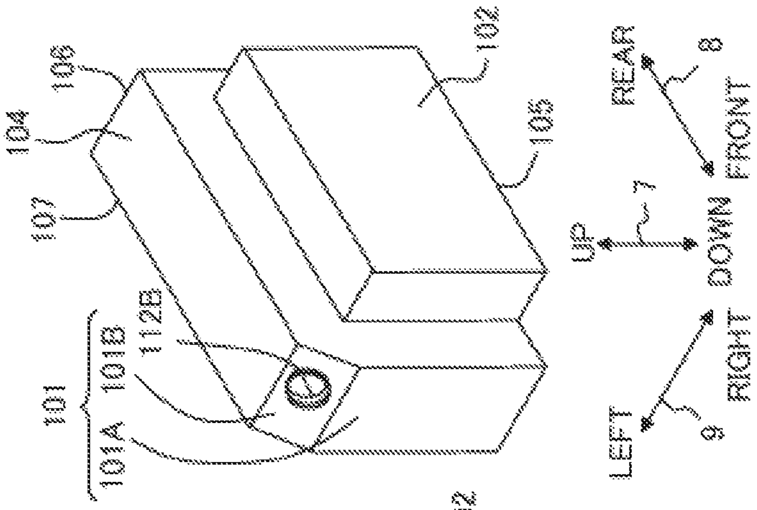
Figure 13B:
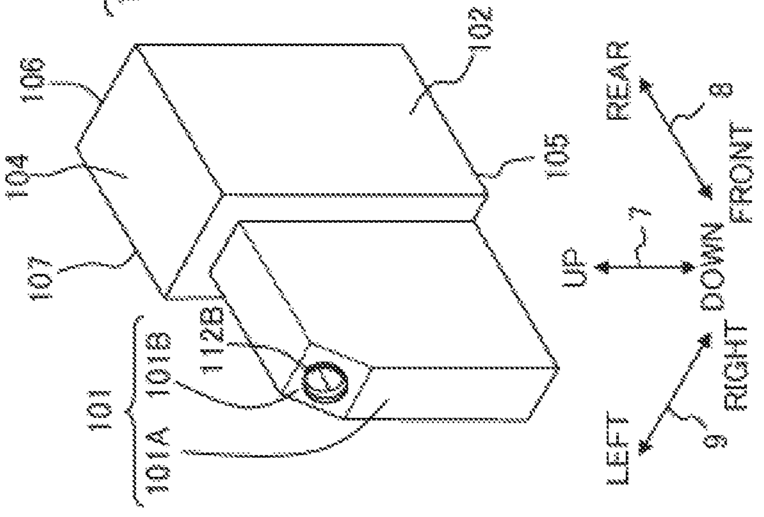
Figure 13A:
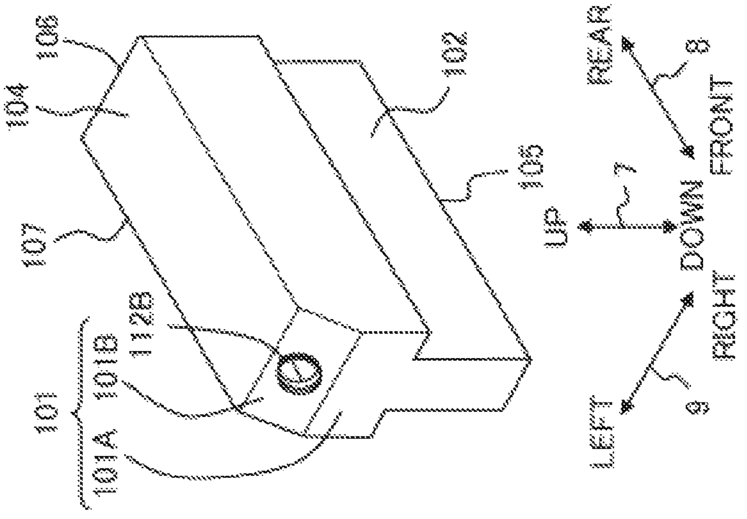

FIG. 13A is a diagram showing another example of a shape of an ink chamber 111B in which, a volume of an upper side from a center is larger than a volume of a lower side from the center, FIG. 13B is a diagram showing still another example of the shape of the ink chamber 111B in which, a volume of a rear side from a center is larger than a volume of a front side from the center, and FIG. 13C is a diagram showing still another example of the shape of the ink chamber 111B in which, a volume of a left side from a center is larger than a volume of a right side from the center.

Figure 14:
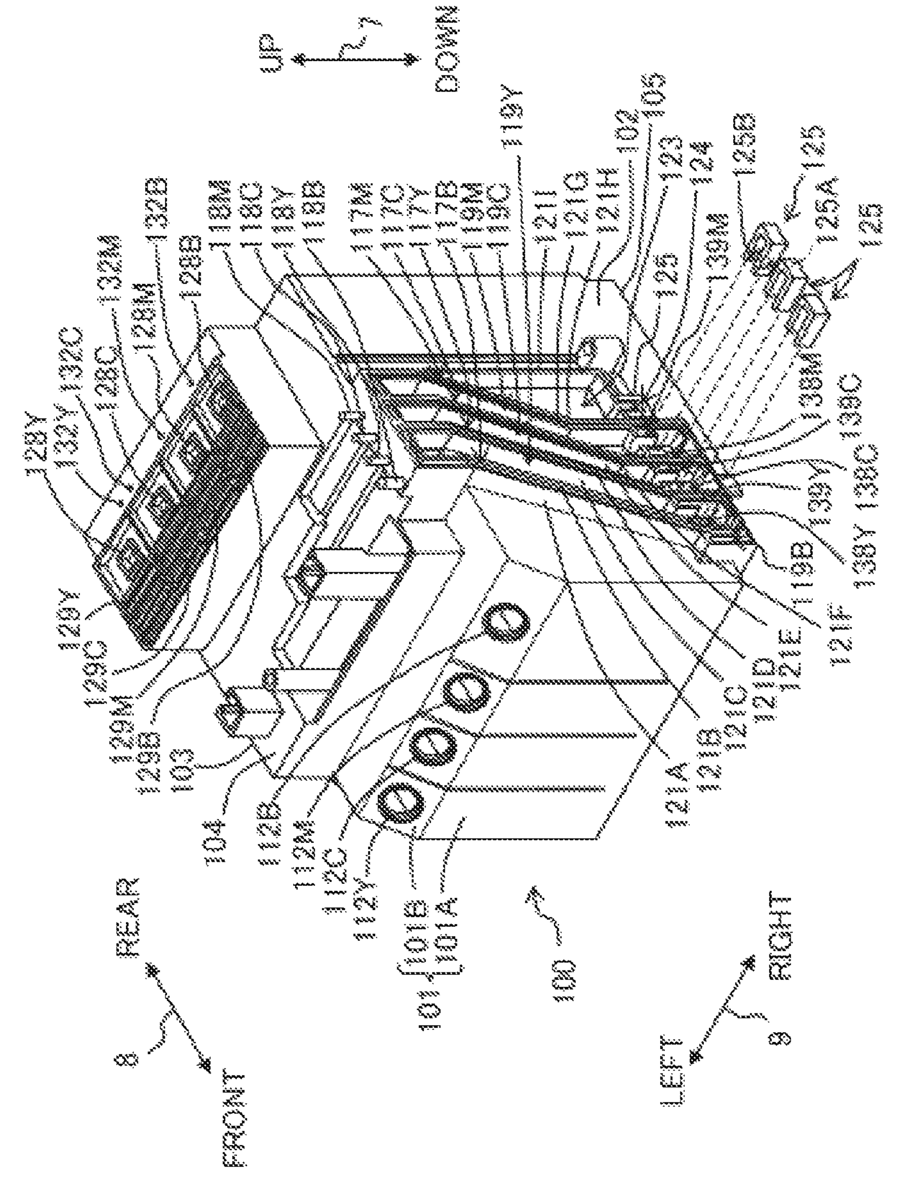

FIG. 14 is a front perspective view of the ink tank 100 which includes a first receiving portion 138 and a second receiving portion 139 which receive an optical sensor 125.

Figure 15A:
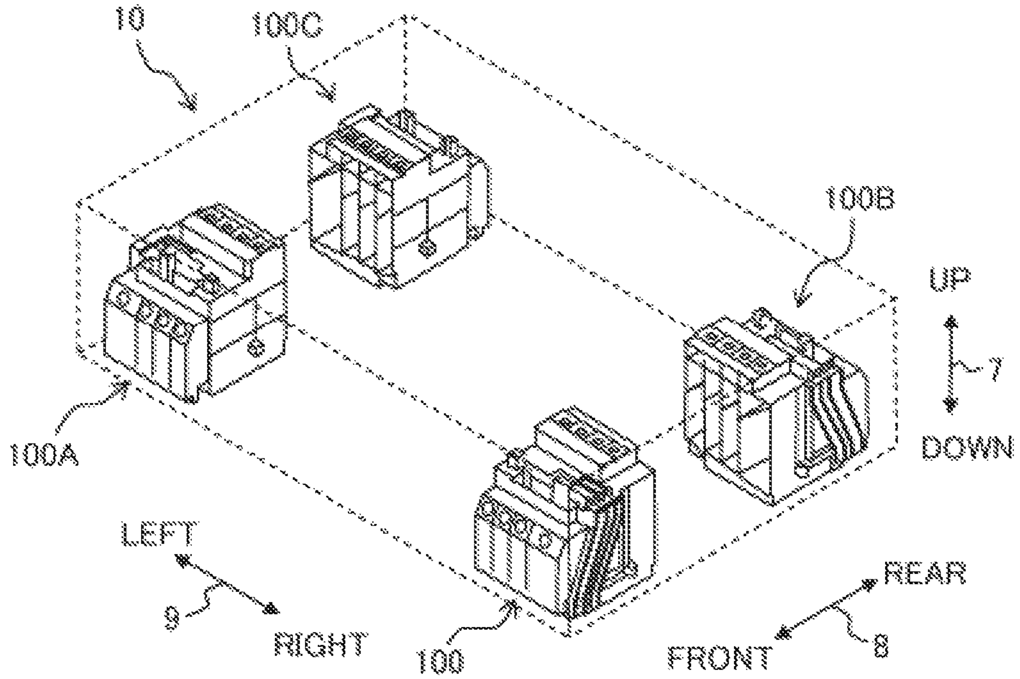
Figure 15B:
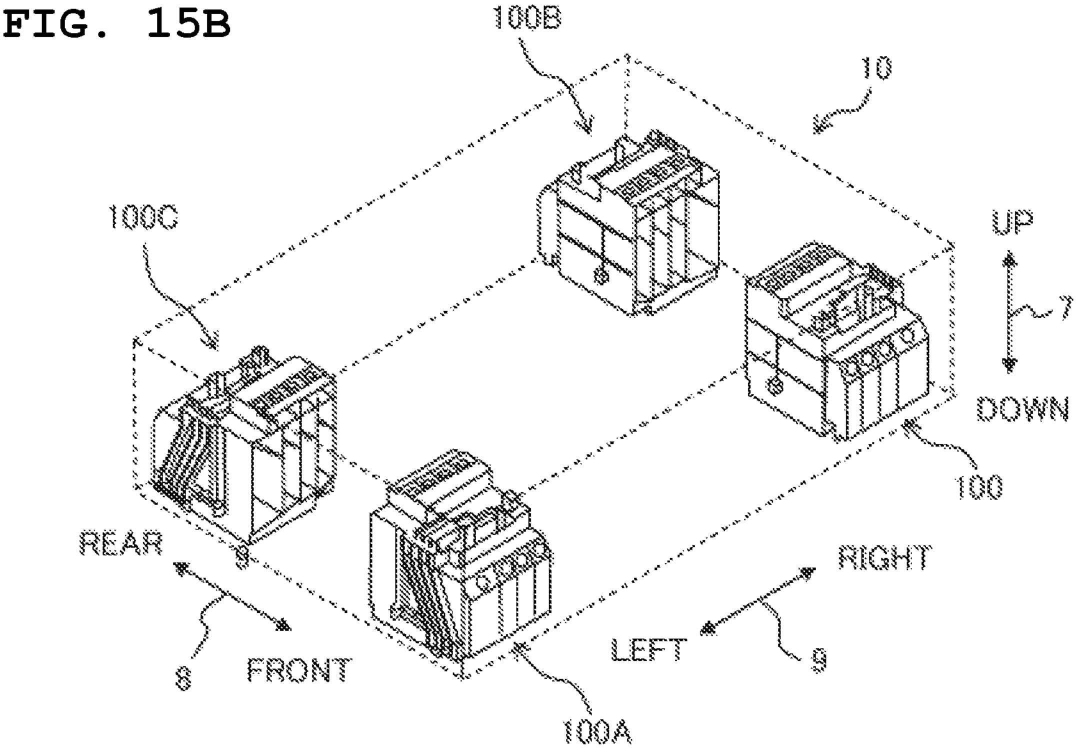

FIG. 15A and FIG. 15B are layouts of ink tanks 100, 100A, 100B, and 100C inside the multi function peripheral 10.

An embodiment of the present teaching will be described below. However, the embodiment described below is merely an example of the present teaching. It is needless to say that it is possible to make appropriate changes in the embodiment of the present teaching without departing from the scope of the teaching. As depicted in FIG. 1, a state in which a multi function peripheral 10 is usably installed will be referred to as a 'usable state'. Moreover, as depicted in FIG. 1, a posture in which the multi function peripheral 10 is usably installed will be referred to as a 'usable posture'. An up-down direction 7 will be defined based on the usable state or the usable posture. A front-rear direction 8 is defined by letting a side on which an opening 13 of the multi function peripheral 10 is provided, to be a frontward side (front face), and a left-right direction 9 is defined by viewing the multi function peripheral 10 from the frontward side (front face). An upward direction is a component of the up-down direction 7, and a downward direction is a component of the up-down direction 7. The upward direction and the downward direction are mutually opposite directions. Similarly, each of a leftward direction and a rightward direction is a component of the left-right direction 9. Moreover, the leftward direction and the rightward direction are mutually opposite directions. Each of a frontward direction and a rearward direction is a component of the front-rear direction 8. Moreover, the frontward direction and the rearward direction are mutually opposite directions. In the present embodiment, the up-down direction corresponds to a vertical direction, and the front-rear direction 8 and the left-right direction 9 correspond to a horizontal direction.

<Overall Arrangement of Multi Function Peripheral 10>

A multi function peripheral 10, as depicted in FIG. 1, is formed to be substantially rectangular parallelepiped shaped. The multi function peripheral 10 includes at a lower side, a printer unit 11 which records an image onto a paper 12 (refer to FIG. 2) by an ink-jet recording method. As depicted in FIG. 2, the printer unit 11 includes a feeding section 15, a feeding tray 20, a discharge tray 21, a conveyance roller section 54, a recording section 24, a discharge roller section 55, a platen 42, and an ink tank 100 (an example of a tank). Moreover, the multi function peripheral 10 has various functions such as a facsimile function and a print function. The multi function peripheral 10 is an example of a liquid discharge apparatus or a liquid consuming apparatus. Moreover, the conveyance roller section 54 and the discharge roller section 55 are an example of a conveyance mechanism.

<Feeding Tray 20 and Discharge Tray 21>

As depicted in FIG. 1, the feeding tray 20 is removably inserted into the multi function peripheral 10 by a user, in the front-rear direction 8 through the opening 13. The opening 13 is formed in a central portion in the left-right direction 9 of a front surface of the multi function peripheral 10. The feeding tray 20 is capable of supporting a plurality of sheets of paper 12. The discharge tray 21 is arranged at an upper side of the feeding tray 20, and is removably inserted together with the feeding tray 20. The discharge tray 21 supports the paper 12 discharged through a space between the recording section 24 and the platen 42 by the discharge roller section 55.

<Feeding Section 15>

The feeding section 15 feeds the paper 12 supported by the feeding tray 20 to a conveyance route 65. As depicted in FIG. 2, the feeding tray 15 includes a feeding roller 25, a feeding arm 26, and a shaft 27. The feeding roller 25 is rotatably supported by the feeding arm 26 at a front end thereof. The feeding roller 25 rotates in a direction of conveying the paper 12 in a conveyance direction 16 by reverse rotation of a conveyance motor (not depicted in the diagram). In the following description, rotation of the feeding roller 25, a conveyance roller 60, and a discharge roller 62 in a direction of conveying the paper 12 in the conveyance direction 16 will be referred to as ‘normal rotation’. The feeding arm 26 is pivotably or swingably supported by the shaft 27 that is supported by a frame of the printer unit 11. A bias is applied to the feeding arm 26 by an elastic force by a spring or a weight of the feeding arm 26, such that the feeding arm 26 is pivoted toward the feeding tray 20.

<Conveyance Route 65>

Figure 2:
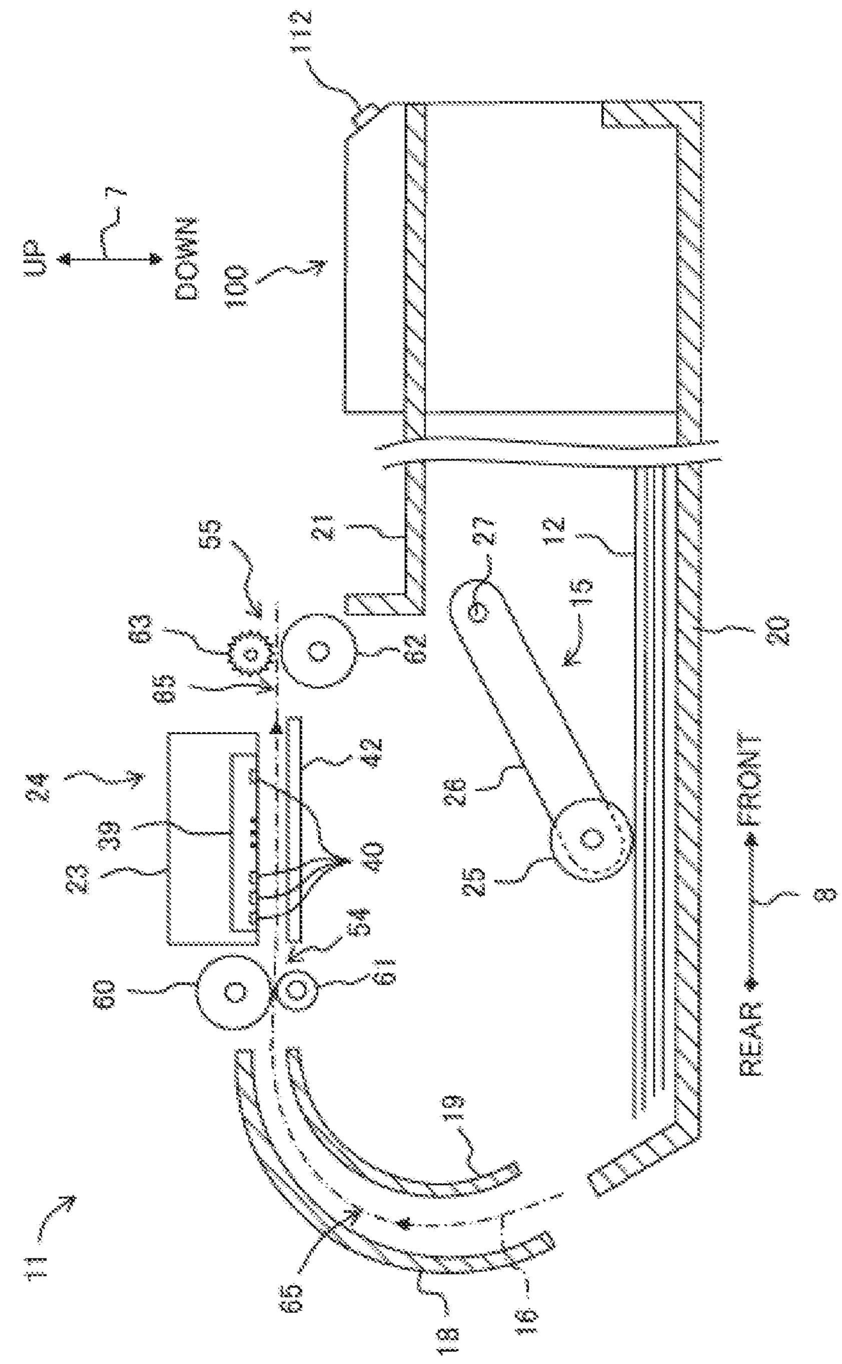
FIG. 2 is a vertical cross-sectional view showing schematically an internal structure of a printer unit 11.
Figure 3:
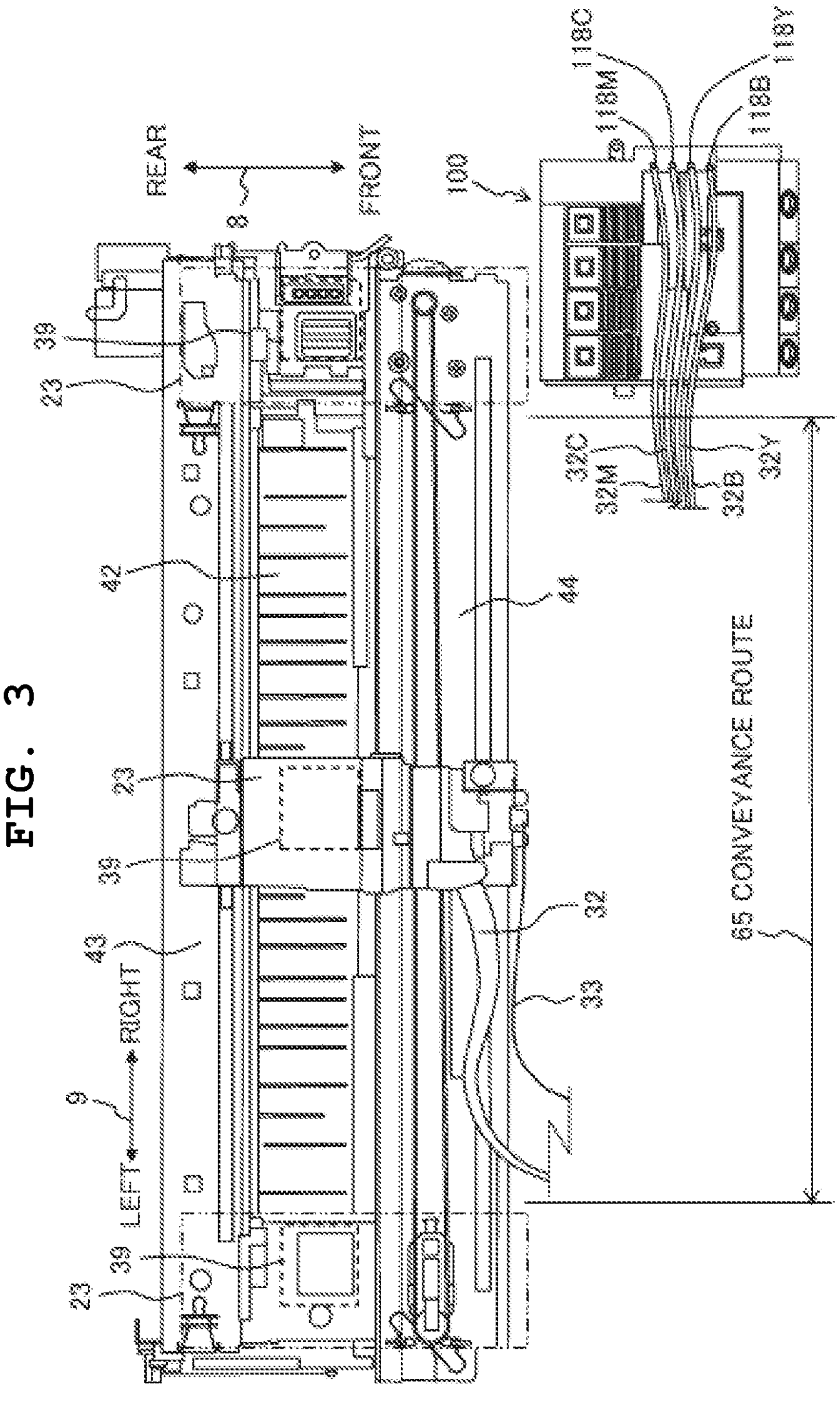
FIG. 3 is a plan view showing an arrangement of a carriage 23 and an ink tank 100.

As depicted in FIG. 2, at an interior of the printer unit 11, a space is formed by an outer guide member 18 and an inner guide member 19 which are arranged to face with each other with a predetermined gap therebetween. This space is called as a conveyance route 65. The conveyance route 65 is a path that is extended from a rear-end portion of the feeding tray 20 toward a rear side of the printer unit 11. Moreover, the conveyance route 65 makes a U-turn while being extended from a lower side to an upper side at the rear side of the printer unit 11. Furthermore, the conveyance route 65 reaches the discharge tray 21 via a space between the recording section 24 and the platen 42. As depicted in FIGS. 2 and 3, a portion of the conveyance route 65 between the conveyance roller section 54 and the discharge roller section 55 is provided at a substantially central portion in the left-right direction 9 of the multi function peripheral 10, and is extended in the front-rear direction 8. The conveyance direction 16 of the paper 12 in the conveyance route 65 is indicated by a dashed-dotted line in FIG. 2.

<Conveyance Roller Section 54>

As depicted in FIG. 2, the conveyance roller section 54 is arranged at an upstream side of the conveyance direction 16 from the recording section 24. The conveyance roller section 54 includes the conveyance roller 60 and a pinch roller 61 which are facing mutually. The conveyance roller 60 is driven by a conveyance motor. The pinch roller 61 rotates following the rotation of the conveyance roller 60. The paper 12 is conveyed in the conveyance direction 16 by being pinched between the conveyance roller 60 and the pinch roller 61 undergoing positive rotation by normal rotation of the conveyance motor.

<Discharge Roller Section 55>

As depicted in FIG. 2, the discharge roller section 55 is arranged at a downstream side of the conveyance direction 16 from the recording section 24. The discharge roller section 55 includes the discharge roller 62 and a spur 63 which are facing mutually. The discharge roller 62 is driven by the conveyance motor. The spur 63 rotates following the rotation of the discharge roller 62. The paper 12 is conveyed in the conveyance direction 16 by being pinched between the discharge roller 62 and the spur 63 undergoing positive rotation by normal rotation of the conveyance motor.

<Recording Section 24>

As depicted in FIG. 2, the recording section 24 is arranged between the discharge roller section 55 and the conveyance roller section 54 in the conveyance direction 16. Moreover, the platen 42 and the recording section 24 are arranged to face with each other in the up-down direction 7, sandwiching the conveyance route 65. In other words, the recording section 24 is arranged to face the conveyance route 65, at an upper side of the conveyance route 65. The recording section 24 includes a carriage 23 and a recording head 39 (an example of a head or a liquid consuming section).

As depicted in FIG. 3, the carriage 23 is supported by guide rails 43 and 44 extended in the left-right direction 9 at positions isolated in the front-rear direction 8. The guide rails 43 and 44 are supported by the frame of the printer unit 11. The carriage 23 is connected to a known belt mechanism that is provided to the guide rail 44. The belt mechanism is driven by a carriage motor (not depicted in the diagram). In other words, the carriage 23 connected to the belt mechanism reciprocates in the left-right direction 9 by being driven by the carriage motor. As depicted by alternate long and short dash lines, a range of movement of the carriage 23 ranges from a left side of the conveyance route 65 to a right side of the conveyance route 65 in the left-right direction 9.

Moreover, an ink tube 32 connecting the ink tank 100 and the recording head 39, and a flexible flat cable 33 which connects electrically a control substrate on which a controller (not depicted in the diagram) is mounted and the recording head 39, are extended from the carriage 23. The ink tube 32 supplies an ink stored in the ink tank 100 to the recording head 39. More elaborately, four ink tubes 32B, 32M, 32C, and 32Y through which inks of black, magenta, cyan, and yellow are distributed are extended from the ink tank 100, and are connected to the carriage 23 in a bundled form. In the following description, the four ink tubes 32B, 32M, 32C, and 32Y will be collectively referred to as ‘ink tube 32’. The flexible flat cable 33 transmits a control signal output from the controller to the recording head 39.

As depicted in FIG. 2, the recording head 39 is installed on the carriage 23. A plurality of nozzles 40 is formed in a lower surface of the recording head 39. Front ends of the plurality of nozzles 40 are exposed through the lower surface of the recording head 39 and the carriage 23 on which the recording head 39 is installed. In the following description, the surface through which the front ends of the nozzles 40 are exposed will be referred to as ‘nozzle surface’. The recording head 39 jets ink as fine ink droplets through the nozzles 40. In a process of the movement of the carriage 23, the recording head 39 jets the ink droplets toward the paper 12 supported by the platen 42. Accordingly, an image is recorded on the paper 12.

<Platen 42>

As depicted in FIGS. 2 and 3, the platen 42 is arranged between the discharge roller section 55 and the conveyance roller section 54 in the conveyance direction 16. The platen 42 is arranged to face the recording section 24 in the up-down direction 7, and supports the paper 12 conveyed by the conveyance roller section 54 from a lower side.

<Ink Tank 100>

Figure 1A:
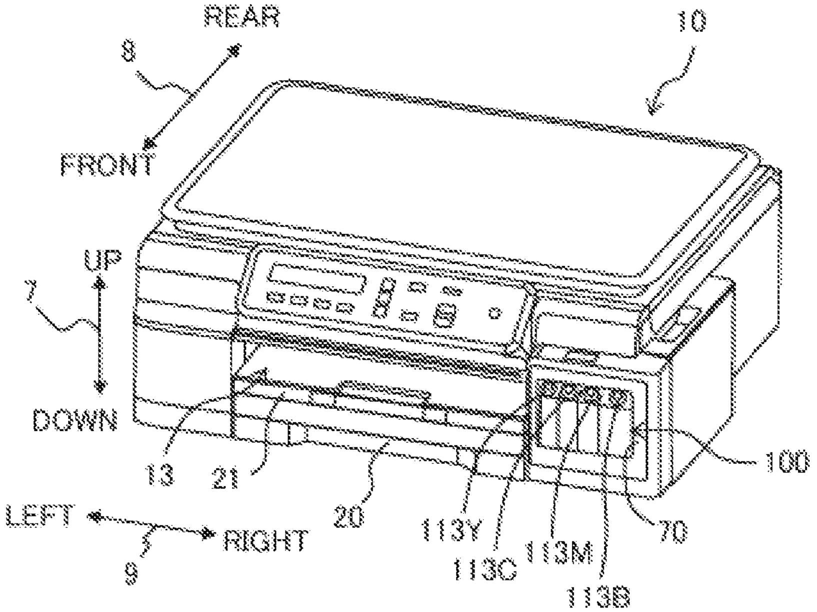
Figure 1B:
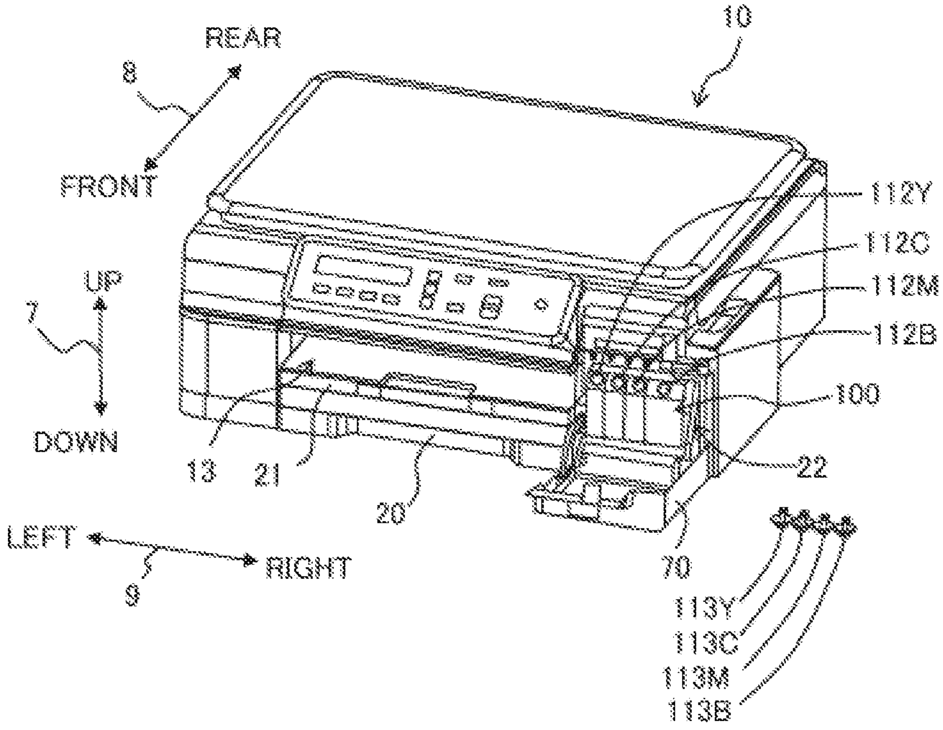

As depicted in FIGS. 1A and 1B, the ink tank 100 is accommodated in the multi function peripheral 10. The ink tank 100 is fixed to the multi function peripheral 10 such that it can not be removed easily from the multi function peripheral 10. A front surface of the ink tank 100 is exposed to an outside of the multi function peripheral 10 through an opening 22 that is formed at a right end, in the left-right direction 9, of the front surface of the multi function peripheral 10. The opening 22 is adjacent to the opening 13 in the left-right direction 9. Moreover, the multi function peripheral 10 is provided with a cover 70 which is pivotable or swingable between a covered position covering the opening 22 (refer to FIG. 1A), and an exposed position of exposing the opening 22 (refer to FIG. 1B). The cover 70 is supported by the multi function peripheral 10 to be pivotable around a pivot shaft extended in the left-right direction 9 at a lower end portion in the up-down direction 7.

Figure 4:
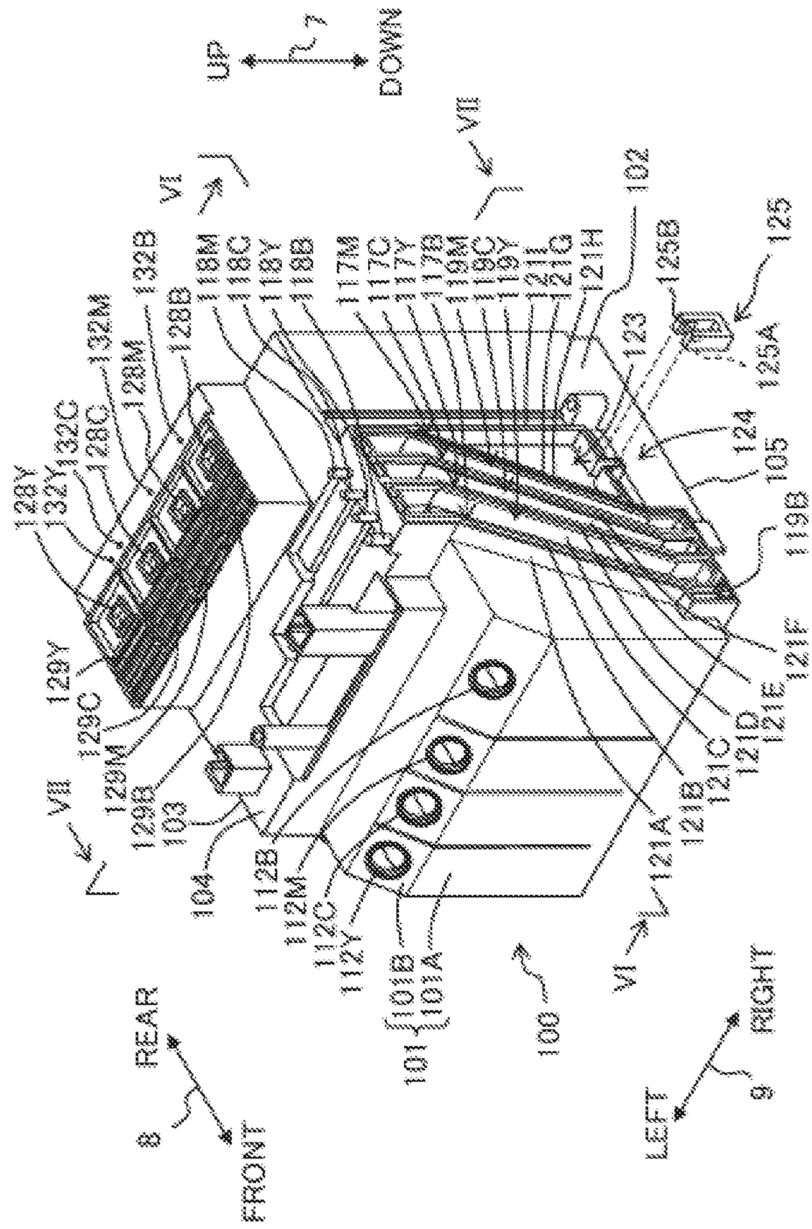
FIG. 4 is a front perspective view of the ink tank 100.
Figure 5:
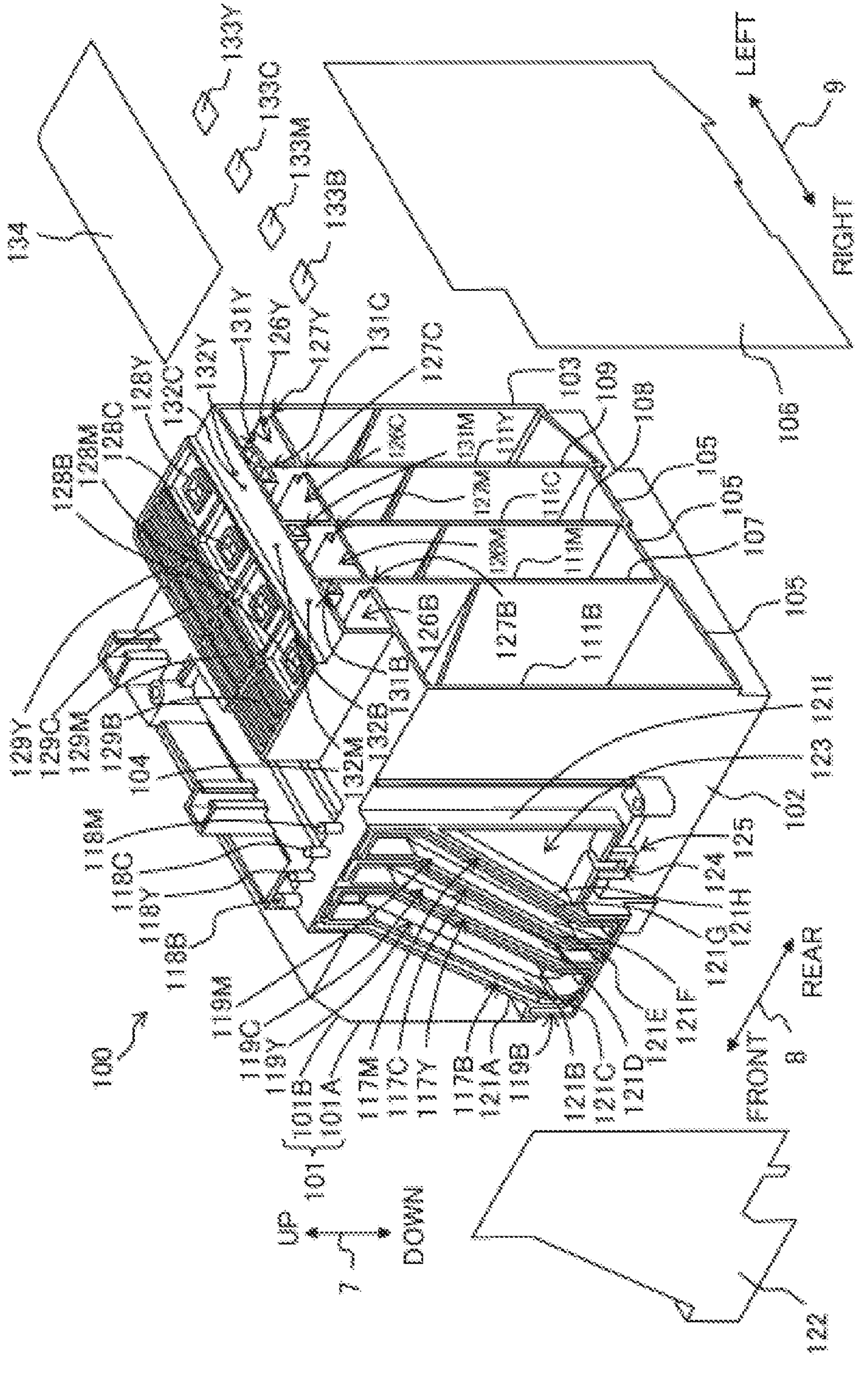
FIG. 5 is a rear perspective view of the ink tank 100.

As depicted in FIGS. 4 and 5, the ink tank 100 has a substantially rectangular parallelepiped shape. The ink tank 100 has a front wall 101, a right wall 102, a left wall 103, an upper wall 104, and a lower wall 105. The front wall 101 includes an erected wall 101A which is extended substantially in the up-down direction 7 from the lower wall 105, and an inclined wall 101B (an example of an outer wall) which is connected to an upper end of the erected wall 101A and is inclined with respect to the up-down direction 7 and the front-rear direction 8. The inclined wall 101B is inclined toward a rear side with respect to the erected wall 101A. Moreover, an upper surface of the lower wall 105 which forms a bottom surface of an ink chamber 111 which will be described later, is inclined downward toward right side. On the other hand, a rear surface of the ink tank 100 is open. Moreover, the rear surface of the ink tank 100 is sealed by a film 106 being adhered or welded to a rear-end surface of the lower wall 105, the upper wall 104, the left wall 103, and the right wall 102. In other words, the film 106 forms a rear wall of the ink tank 100.

<Ink Chamber 111>

A plurality of partition walls 107, 108, and 109 which demarcate an internal space is provided at an interior of the ink tank 100 as depicted in FIG. 5. Each of the partition walls 107, 108, and 109 is extended in the up-down direction 7 and the front-rear direction 8, and is connected to the front wall 101, the upper wall 104, the lower wall 105, and the film 106. Moreover, the partition walls 107, 108, and 109 are provided to be separated apart in the left-right direction 9. As a result, an internal space of the ink tank 100 is partitioned into four ink chambers 111B, 111M, 111C, and 111Y which are adjacent in the left-right direction 9. The ink chamber 111 is an example of a liquid storage chamber for storing ink to be jetted through the nozzles 40.

The ink chamber 111B is a space demarcated by the front wall 101, the right wall 102, the upper wall 104, the lower wall 105, the film 106, and the partition wall 107. The ink chamber 111M is a space demarcated by the front wall 101, the upper wall 104, the lower wall 105, the film 106, and the partition walls 107 and 108. The ink chamber 111C is a space demarcated by the front wall 101, the upper wall 104, the lower wall 105, the film 106, and the partition walls 108 and 109. The ink chamber 111Y is a space demarcated by the front wall 101, the left wall 103, the upper wall 104, the lower wall 105, the film 106, and the partition wall 109.

In the following description, the ink chambers 111B, 111M, 111C, and 111Y are collectively referred to as 'ink chamber 111'. Moreover, reference numerals having different alphabets as a suffix (B, M, C, and Y) are assigned to components each of which corresponds to one of the four ink chambers 111 and which are collectively referred to with the alphabets omitted.

Inks of different colors are stored in each ink chamber 111. Concretely, black ink is stored in the ink chamber 111B, cyan ink is stored in the ink chamber 111C, magenta ink is stored in the ink chamber 111M, and yellow ink is stored in the ink chamber 111Y. Each color ink is an example of a liquid. However, the number of ink chambers 111 and the colors of inks are not restricted to the number and the colors in the abovementioned example. The ink chamber 111 is arranged along the left-right direction 9 (an example of a first direction). Moreover, in the four ink chambers 111B, 111M, 111C, and 111Y, the ink chamber 111B is arranged at the extreme right side and the ink chamber 111Y is arranged at the extreme left side. Furthermore, the ink chamber 111B has a volume larger than the other ink chambers 111M, 111C, and 111Y.

<Inlet 112>

The inclined wall 101B of the ink tank 100 is provided with inlets 112B, 112M, 112C, and 112Y (hereinafter, collectively referred to as 'inlet 112') for allowing the ink to flow into the ink chambers 111. The inlet 112 runs through a thickness direction of the inclined wall 101B and makes the corresponding ink chamber 111 communicate with an exterior of the ink tank 100. An inner surface of the inclined wall 101B faces the ink chamber 111, and an outer surface of the inclined wall 101B faces the exterior of the ink tank 100. The inclined wall 101B is inclined such that the outer surface thereof is positioned at an upper side of the inner surface of the inclined wall 101B. Consequently, the inlet 112 makes the ink chamber 111 and the exterior of the ink tank 100 communicate directly. In other words, between the inlet 112 and the ink chamber 111, there is no channel which has a cross-sectional area smaller than a cross-sectional area of the inlet 112, and which is curved.

As depicted in FIG. 1B, the inclined wall 101B and the inlet 112 provided to the inclined wall 101B are exposed to an exterior of the multi function peripheral 10 via the opening 22 when the cover 70 is positioned at an exposed position. In the present embodiment, a posture of the ink tank 100 when the ink is refilled into the ink chamber 111 through the inlet 112 (refilling posture) coincides with a posture of the ink tank 100 when the multi function peripheral 10 is in a usable posture. In other words, when the multi function peripheral 10 is in the usable posture, the ink is refilled into the ink chamber 111 through the inlet 112.

The ink tank 100 has caps 113B, 113M, 113C, and 113Y (hereinafter, collectively referred to as 'the cap 113') that are detachable from the inlet 112. As depicted in FIG. 1A, the cap 113 which is put on the inlet 112 blocks the inlet 112 by making a tight contact with a periphery of the inlet 112. Whereas, as depicted in FIG. 1B, the cap 113 removed from the inlet 112 opens the inlet 112. The cap 113 is put on and removed from the inlet 112 in a state of the cover 70 positioned at the exposed position. Moreover, by removing the cap 113 from the inlet 112, it is possible to refill the ink into the ink chamber 111.

<Ink Outflow Channel 114>

Ink outflow channels 114B, 114M, 114C, and 114Y (hereinafter, collectively referred to as 'ink outflow channel 114') (an example of a liquid outflow channel) are connected to the ink chamber 111 as depicted in FIGS. 6 to 9B. The ink outflow channel 114 is a channel that makes the ink stored in the corresponding ink chamber 111 outflow to the exterior of the ink tank 100. The ink outflow channel 114 in the present embodiment is a channel running from the corresponding ink chamber 111 up to a right side surface of the ink tank 100 (in other words, an outer surface of the right wall 102). The right side surface (in other words, the outer surface of the right wall 102) is an example of an outer surface which intersects with the left-right direction 9.

Figure 7:
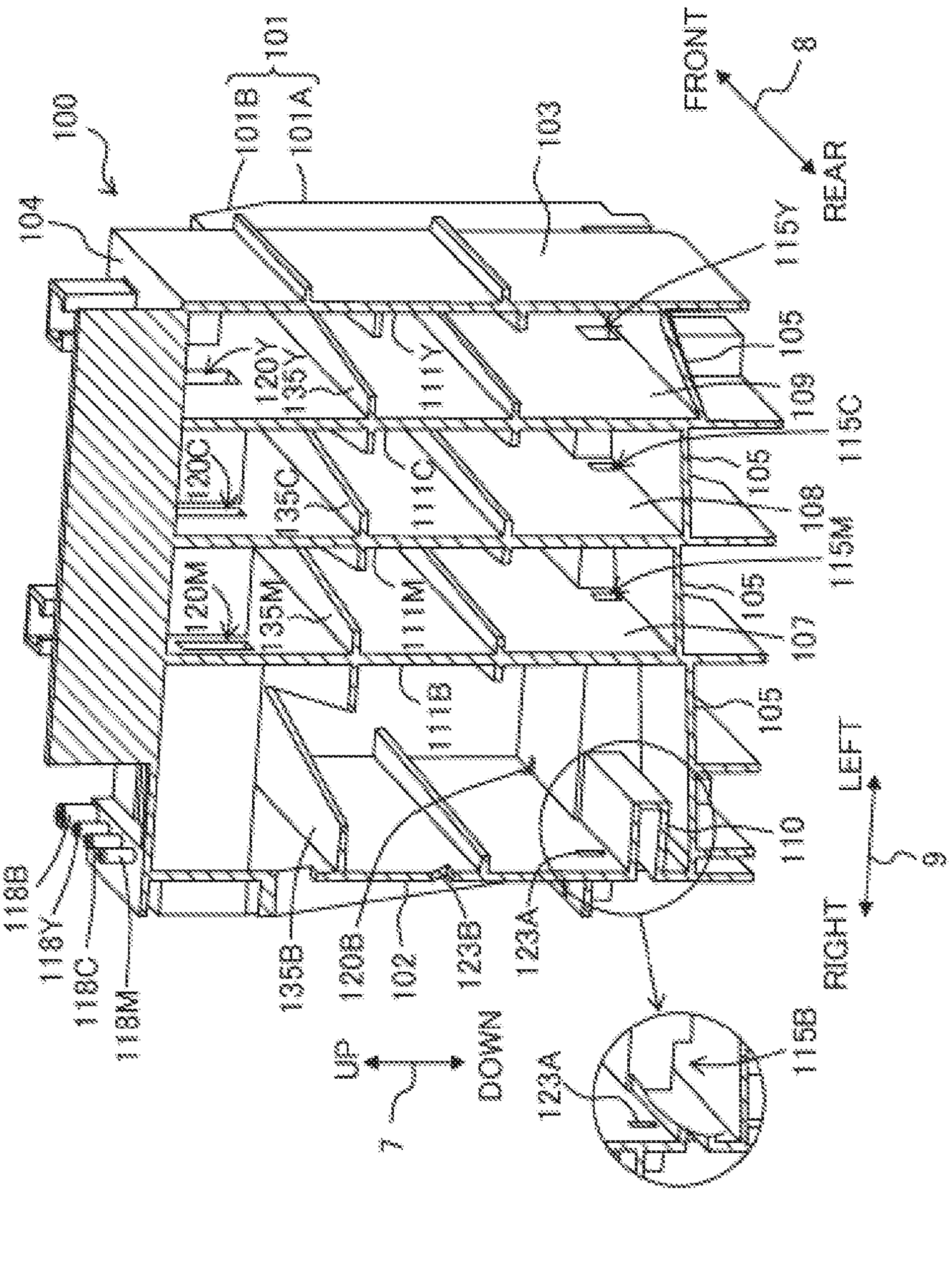
FIG. 7 is a cross-sectional perspective view along a line VII-VII in FIG. 4.
Figure 8:
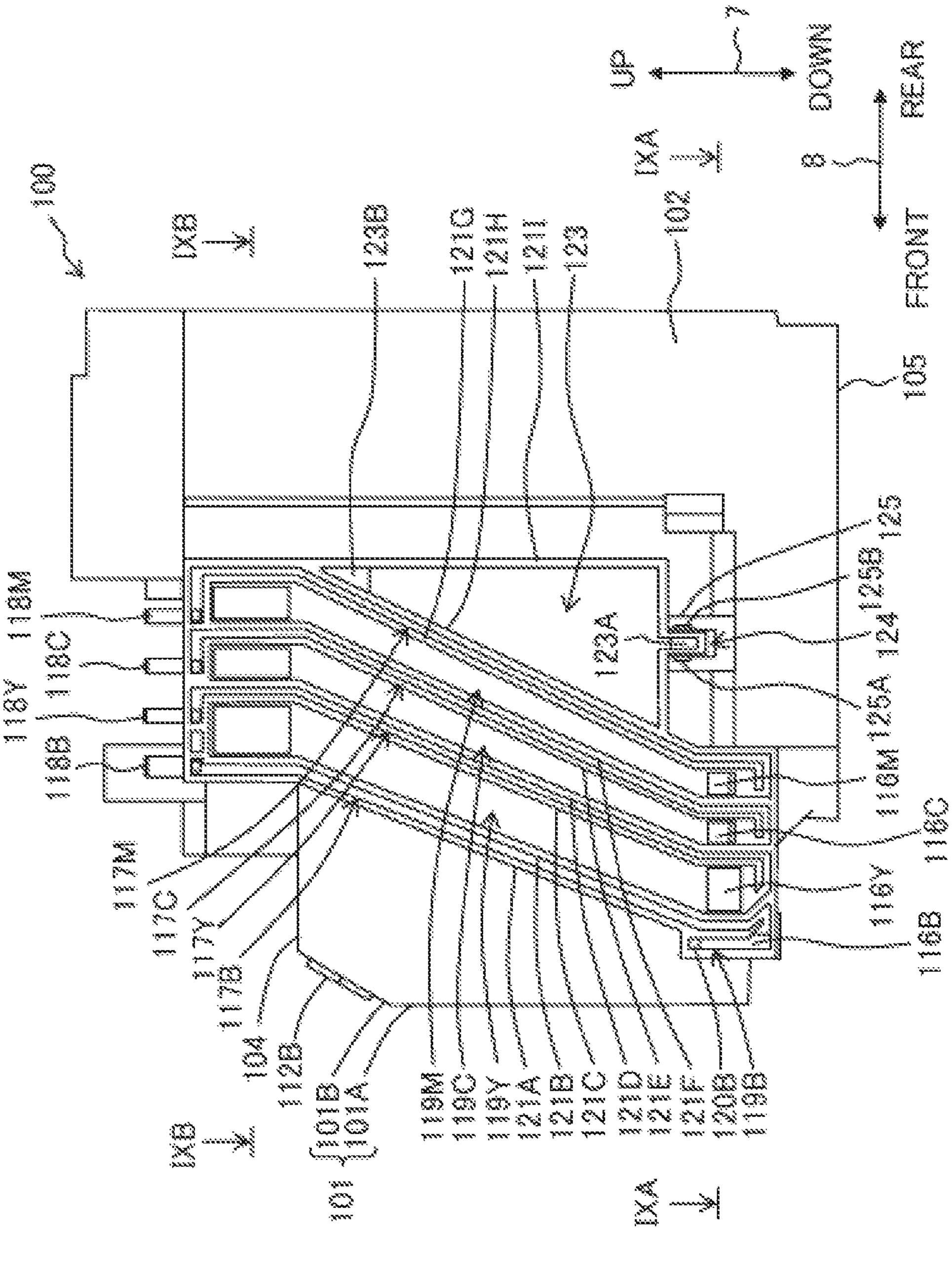
FIG. 8 is a right-side view of the ink tank 100.
Figure 9A:
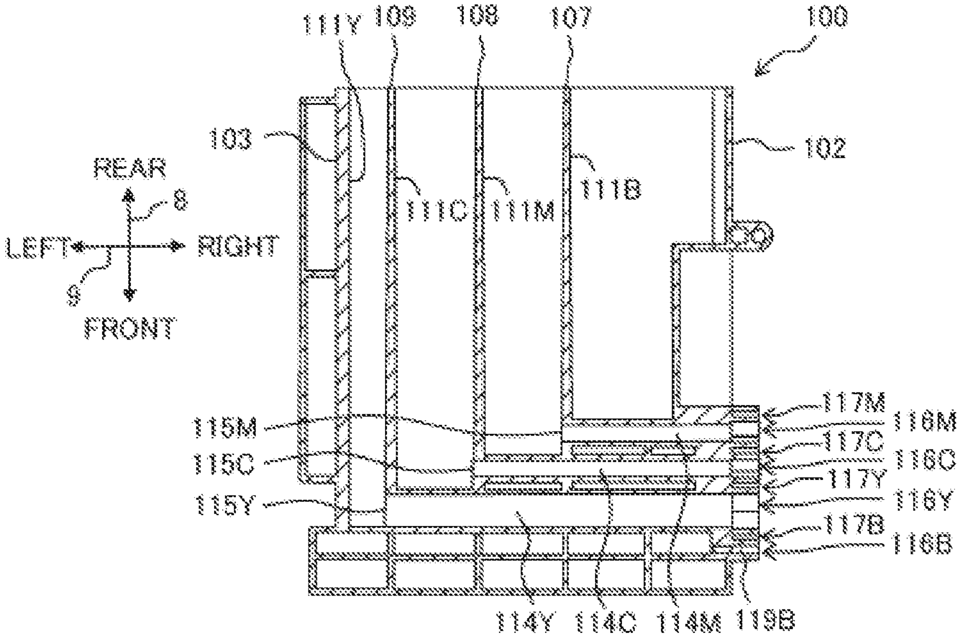
FIG. 9A is a cross-sectional view along a line IXA-IXA in FIG. 8.

The ink outflow channel 114Y, as depicted in FIG. 7, communicates with the ink chamber 111Y through an opening 115Y provided near a lower end of the partition wall 109 which demarcates a right surface of the ink chamber 111Y Moreover, as depicted in FIG. 8, the ink outflow channel 114Y reaches right side surface of the ink tank 100 via an opening 116Y provided in the right wall 102. More elaborately, as depicted in FIG. 9A, the ink outflow channel 114Y is extended rightward along the left-right direction 9 from the opening 115Y at a frontward side of the ink chambers 111B, 111M, and 111C, and reaches the opening 116Y upon running through the right wall 102 (in other words, the right side surface of the ink tank 100).

The ink outflow channel 114C, as depicted in FIG. 7, communicates with the ink chamber 111C through an opening 115C provided near a lower end of the partition wall 108 which demarcates a right surface of the ink chamber 111C. Moreover, as depicted in FIG. 8, the ink outflow channel 114C reaches the right side surface of the ink tank 100 through an opening 116C provided in the right wall 102. More elaborately, as depicted in FIG. 9A, the ink outflow channel 114C is extended rightward along the left-right direction 9 from the opening 115C at a frontward side of the ink chambers 111B and 111M, and reaches the opening 116C upon running through the right wall 102.

As depicted in FIG. 7, the ink outflow channel 114M communicates with the ink chamber 111M through an opening 115M provided near a lower end of the partition wall 107 which demarcates a right surface of the ink chamber 111M. Moreover, as depicted in FIG. 8, the ink outflow channel 114M reaches the right side surface of the ink tank 100 through an opening 116M provided in the right wall 102. More elaborately, as depicted in FIG. 9A, the ink outflow channel 114M is extended rightward along the left-right direction 9 from the opening 115M at a frontward side of the ink chamber 111B, and reaches the opening 116M upon running through the right wall 102.

As depicted in FIG. 7, the ink outflow channel 114B communicates with the ink chamber 111B through an opening 115B provided near a boundary of the lower wall 105 and the right wall 102 which demarcates a right surface and a bottom surface of the ink chamber 111B. At an upper side of the opening 115B, a partition wall 110 which intersects a direction of inflow of ink to the opening 115B (in other words, downward in the up-down direction 7) is provided. Moreover, as depicted in FIG. 8, the ink outflow channel 114B reaches the right side surface of the ink tank 100 through an opening 116B provided in the right wall 102.

Figure 6:
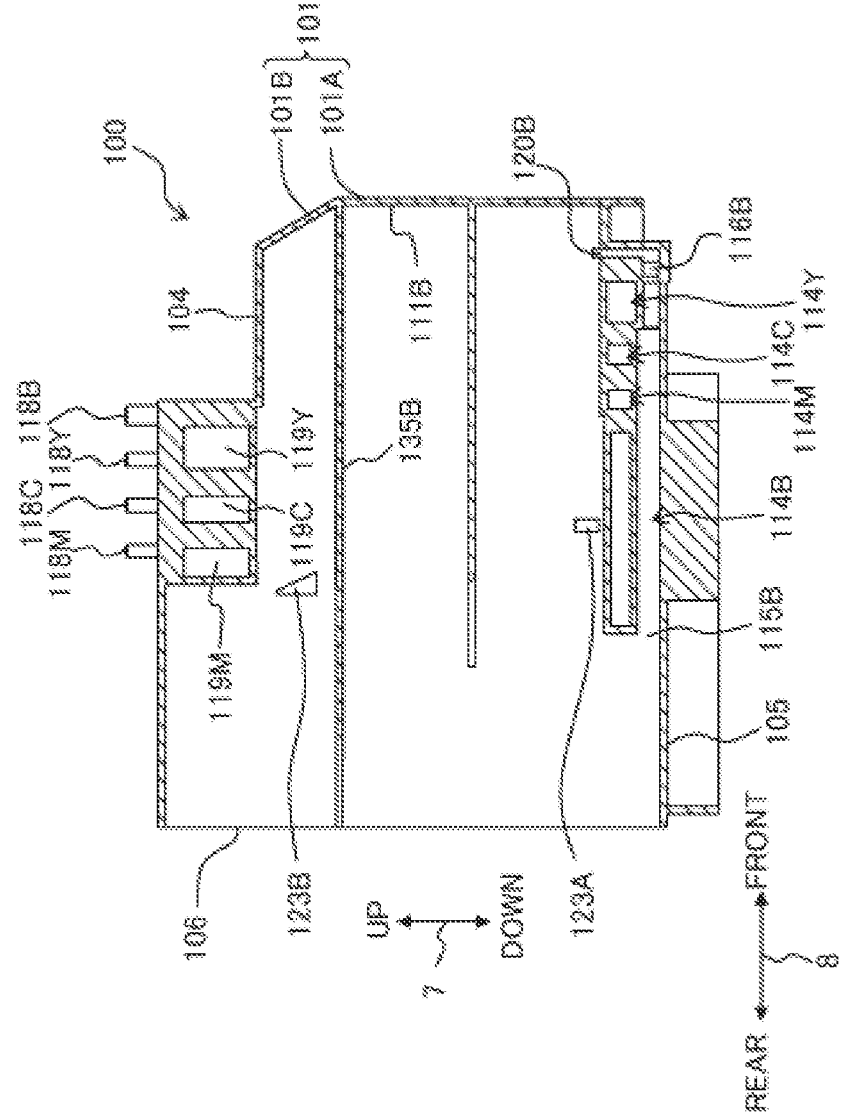
FIG. 6 is a cross-sectional view along a line VI-VI in FIG. 4.

As depicted in FIG. 6, the ink outflow channel 114B is extended frontward along the front-rear direction 8 from the opening 115M, and reaches the opening 116B through the right wall 102 at a frontward side of the ink outflow channels 114M, 114C, and 114Y Moreover, the ink outflow channel 114B extended in the front-rear direction 8 intersects the ink outflow channels 114M, 114C, and 114Y extended in the left-right direction 9. More elaborately, the ink outflow channel 114B is extended frontward at a lower side of the ink outflow channels 114M, 114C, and 114Y extended in the left-right direction 9.

In other words, as depicted in FIG. 7, the openings 115B, 115M, 115C, and 115Y which connect the corresponding ink chambers 111B, 111M, 111C, and 111Y and the ink outflow channels 114B, 114M, 114C, and 114Y are provided at a lower side of a center in the up-down direction 7 of the ink chambers 111B, 111M, 111C, and 111Y, at a front side of a center in the front-rear direction 8 of the ink chambers 111B, 111M, 111C, and 111Y, and at a right side of a center in the left-right direction 9 of the ink chambers 111B, 111M, 111C, and 111Y respectively. Moreover, as depicted in FIG. 8, the openings 116B, 116M, 116C, and 116Y are provided at positions at the lower side of the center in the up-down direction 7 and at the front side of the center in the front-rear direction 8 of the ink tank 100 at the right side surface of the ink tank 100. More elaborately, the openings 116 are provided to be adjacent in the front-rear direction 8 in order of the openings 116B, 116Y, 116C, and 116M from a front side to a rear side of the right side surface of the ink tank 100.

The center in the up-down direction 7 of the ink chamber 111 is a center of the maximum dimension in the up-down direction 7 of the ink chamber 111. In the present embodiment, the maximum dimension along the up-down direction 7 of the ink chamber 111 means the maximum dimension along the up-down direction 7 between the upper wall 104 and the lower wall 105. The center in the front-rear direction 8 of the ink chamber 111 is a center of the maximum dimension along the front-rear direction 8 of the ink chamber 111. In the present embodiment, the maximum dimension along the front-rear direction 8 of the ink chamber 111 means the maximum dimension along the front-rear direction 8 between the front wall 101 and the film 106. The center in the left-right direction 9 of the ink chamber 111 is a center of the maximum dimension along the left-right direction 9 of the ink chamber 111. In the present embodiment, the maximum dimension along the left-right direction 9 of the ink chamber 111 means the maximum dimension along the left-right direction 9 between the mutually adjacent partition walls 107, 108, and 109, or, between the right wall 102 or the left wall 103 and the adjacent partition walls 107, 108, and 109. Similarly, the center in the vertical direction of the ink tank 100 is a center of the maximum dimension in the vertical direction of the ink tank 100. The center in the front-rear direction 8 of the ink tank 100 is a center of the maximum dimension along the front-rear direction 8 of the ink tank 100.

Moreover, a volume of each ink outflow channel 114 from the opening 115 up to the opening 116 differs mutually. In the present embodiment, a volume of the ink outflow channel 114Y between the opening 115Y and the opening 116Y is the largest. A volume of the ink outflow channel 114C between the opening 115C and the opening 116C is the second largest. A volume of the ink outflow channel 114M between the opening 115M and the opening 116M is the third largest. A volume of the ink outflow channel 114B between the opening 115B and the opening 116B is the smallest. There are various causes that make the volume of the ink outflow channel 114 different. For instance, the difference in volumes is caused due to a length of the ink outflow channel 114 in the left-right direction 9, or due to a cross-sectional area of the ink outflow channel 114 that is orthogonal to the left-right direction 9.

Furthermore, the maximum amount of the ink to be outflowed per unit time through the ink outflow channel 114 is to be set to be larger than the maximum amount of the ink jetted (an example of the maximum amount consumed) per unit time through the nozzles 40 of the recording head 39. The maximum amount to be outflowed, for instance, is determined by the cross-sectional area of the ink outflow channel 114 orthogonal to the left-right direction 9. A position of the opening 115 is an example of a first position, a fourth position, or a connecting position. Moreover, a position of the opening 116 is an example of a second position or a fifth position.

<Ink Lead-Out Channel 117 and Return Channel 119>

Ink lead-out channels 117B, 117M, 117C, and 117Y (hereinafter, collectively referred to as 'the ink lead-out channel 117') (an example of a liquid lead-out channel) are provided in the right side surface of the ink tank 100 as depicted in FIG. 8. One end of each of the ink lead-out channels 117B, 117M, 117C, and 117Y is connected to the corresponding ink outflow channels 114B, 114M, 114C, and 114Y at a position of each of the openings 116B, 116M, 116C, and 116Y, and the other end of each of the ink lead-out channels 117B, 117M, 117C, and 117Y is connected to connecting portions 118B, 118M, 118C, and 118Y (hereinafter, collectively referred to as 'connecting portion 118') respectively. The four ink tubes 32B, 32M, 32C, and 32Y (hereinafter, collectively referred to as 'ink tubes 32') corresponding to inks of four colors are connected to the connecting portion 118 which is provided to be projected from the upper wall 104 of the ink tank 100 (refer to FIG. 3). In other words, the ink lead-out channel 117 is a channel that guides the ink outflowed from the ink chamber 111 through the corresponding ink outflow channel 114 to the recording head 39 through the ink tube 32 connected to the corresponding connecting portion 118. A volume of each ink lead-out channel 117 and a volume of each ink tube 32 is substantially same.

Figure 9B:
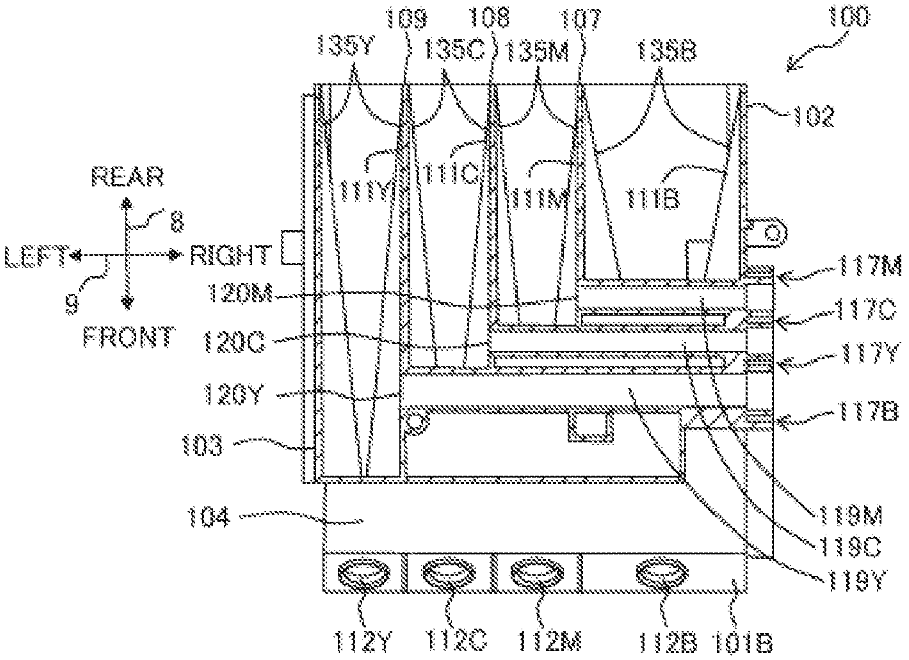
FIG. 9B is a cross-sectional view along a line DCB-DCB in FIG. 8.

Moreover, as depicted in FIG. 8 and FIG. 9B, the right side surface of the ink tank 100 is provided with return channels 119B, 119M, 119C, and 119Y (hereinafter, collectively referred to as 'return channel 119'). One end of each of the return channels 119B, 119M, 119C, and 119Y is connected to the ink outflow channels 114B, 114M, 114C, and 114Y respectively, at positions of the openings 116B, 116M, 116C, and 116Y, and the other end of each of the return channels 119B, 119M, 119C, and 119Y communicates with the corresponding ink chamber 111 through openings 120B, 120M, 120C, and 120Y (hereinafter, collectively referred to as 'opening 120') respectively. The opening 116 and the opening 120 are provided at different positions in the up-down direction 7. More elaborately, the opening 120 is provided at an upper side in the up-down direction 7 of the corresponding opening 116.

Moreover, the opening 120 is provided at an upper side of the center in the up-down direction 7 of the corresponding ink chamber 111 (excluding the opening 120B). More preferably, the opening 120 is provided at a position on an upper side of a liquid level of the ink inside the corresponding ink chamber 111 (excluding the opening 120B). Moreover, the opening 120 is provided at a rear side in the front-rear direction 8 (an example of a third direction) of the corresponding opening 116 (excluding the opening 120B). The opening 120 is provided at a left side in the left-right direction 9 (an example of a fourth direction) of the corresponding opening 116. In other words, the return channel 119 is extended toward an upper side of the up-down direction 7, and toward a rear side of the front-rear direction 8 from the opening 116, and is further extended toward a left side of the left-right direction 9 to reach the opening 120 (excluding the return channel 119B). A position of the opening 120 is an example of a third position or a sixth position.

As depicted in FIG. 8, the right wall 102 of the ink tank 100 is provided with a plurality of projected walls 121A, 121B, 121C, 121D, 121E, 121F, 121G, 121H, and 121I (hereinafter, 'projected walls 121A to 121I'). The plurality of projected walls 121A to 121I will sometimes be collectively referred to as 'projected wall 121'. The projected wall 121 is projected rightward (toward a right side) (an example of an outer side, outward) from an outer surface (right side surface) of the right wall 102, and is extended along the outer surface of the right wall 102. Moreover, a film 122 is adhered or welded to a right-side front end of each projected wall 121. The single (common) film 122 is adhered to the projected walls 121A, 121B, 121C, 121D, 121E, 121F, 121G, 121H, and 121I. The ink lead-out channel 117 and the return channel 119 indicate space demarcated by the adjacent projected walls 121A to 121H, and the film 122.

The projected walls 121A and 121B, which demarcate the ink lead-out channel 117B, are extended rearward from a position sandwiching the opening 116B, and are further extended upward, reaching an upper end portion of the ink tank 100. The projected walls 121C and 121D which demarcate the ink lead-out channel 117Y, the projected walls 121E and 121F which demarcate the ink lead-out channel 117C, and the projected walls 121G and 121H which demarcate the ink lead-out channel 117M are extended downward from a position sandwiching the corresponding openings 116Y, 116C, and 116M respectively, and are further extended upward at a rear side of the openings 116Y, 116C, and 116M reaching the upper end portion of the ink tank 100. In other words, the ink lead-out channels 117Y, 117C, and 117M are connected to the corresponding ink outflow channels 114Y, 114C, and 114M respectively, at a lower portion of the openings 116Y, 116C, and 116M. The lower portion of the openings 116Y, 116C, and 116M refers to a lower side of the center in the up-down direction 7 of the openings 116Y, 116C, and 116M. Furthermore, each ink lead-out channel 117 is connected to the corresponding connecting portion 118 through a space (omitted in the diagram) extended in the up-down direction 7 and the left-right direction 9 at the interior of the ink tank 100.

The projected walls 121A and 121B which demarcate the return channel 119B, the projected walls 121B and 121C which demarcate the return channel 119Y, the projected walls 121D and 121E which demarcate the return channel 119C, and the projected walls 121F and 121G which demarcate the return channel 119M are extended upward from positions sandwiching the corresponding opening 116. In other words, the return channel 119 is connected to the corresponding ink outflow channel 114 at an upper portion of the opening 116. The upper portion of the opening 116 refers to an upper side of the center in the up-down direction 7 of the opening 116. Moreover, as depicted in FIG. 9B, the return channel 119B is extended leftward (toward left side) of the left-right direction 9 of the interior of the ink tank 100 and communicates with the corresponding ink chamber 111 through the opening 120.

In the present embodiment, a channel resistance of the return channels 119Y, 119C, and 119M is to be set to be higher than a channel resistance of the corresponding ink outflow channels 114Y, 114C, and 114M respectively. There are various methods for changing the channel resistance. For example, it is possible to increase the channel resistance by increasing the channel length, by reducing a cross-sectional area of a channel, or by combining the two.

<Additional Ink Chamber 123>

Furthermore, as depicted in FIG. 8, the right side surface of the ink tank 100 is provided with an additional ink chamber 123 (an additional storage chamber). The additional ink chamber 123 is a space which is demarcated by the projected walls 121H and 121I (an example of a peripheral wall) continued in a peripheral direction. The additional ink chamber 123 communicates with the ink chamber 111B by through holes 123A and 123B in the right wall 102. The through hole 123B is provided at an upper side in the up-down direction 7 of the through hole 123A. A portion to be detected (hereinafter, 'detection portion') 124 is formed on the additional ink chamber 123, by a part of the projected wall 121I which demarcates a lower end of the additional ink chamber 123 surrounding a front side, a rear side, and a lower side of the through hole 123A.

<Optical Sensor 125>

As depicted in FIG. 4 and FIG. 8, the multi function peripheral 10 includes an optical sensor 125 having a light emitting unit 125A and a light receiving unit 125B facing mutually in the front-rear direction 8, sandwiching the detection portion 124. The light emitting unit 125A outputs light that is transmitted through the projected wall 121I, but is not transmitted through ink (such as visible light and infrared light) toward the light receiving unit 125B. The light receiving unit 125B outputs to a controller, a high-level signal in response to having received light output from the light emitting unit 125A. The high-level signal refers to a 'signal having a signal level above a threshold value'. On the other hand, the light receiving unit 125B outputs to the controller, a low-level signal in response to not having received light. The low-level signal refers to a 'signal having a signal level below the threshold value'. A threshold value of the high-level signal and a threshold value of the low-level signal may be the same. Or, the threshold value of the high-level signal may have been set to be higher than the threshold value of the low-level signal.

<Atmosphere Communicating Channel 126>

Figure 10B:
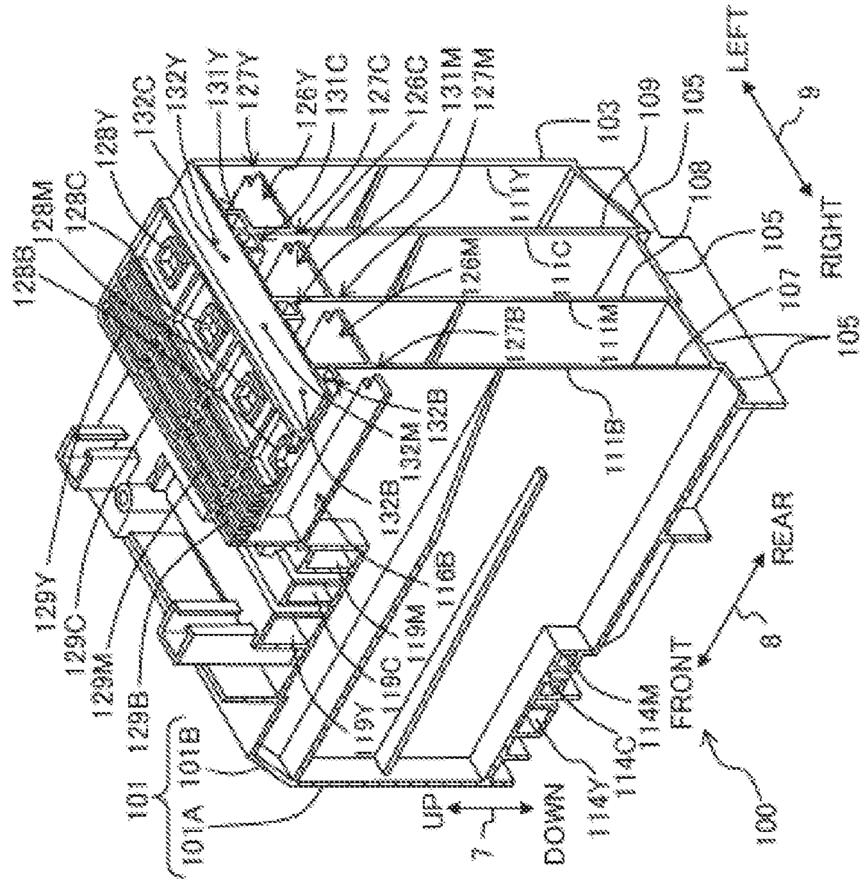
FIG. 10B is a cross-sectional perspective view along a line XB-XB in FIG. 10A.
Figure 10A:
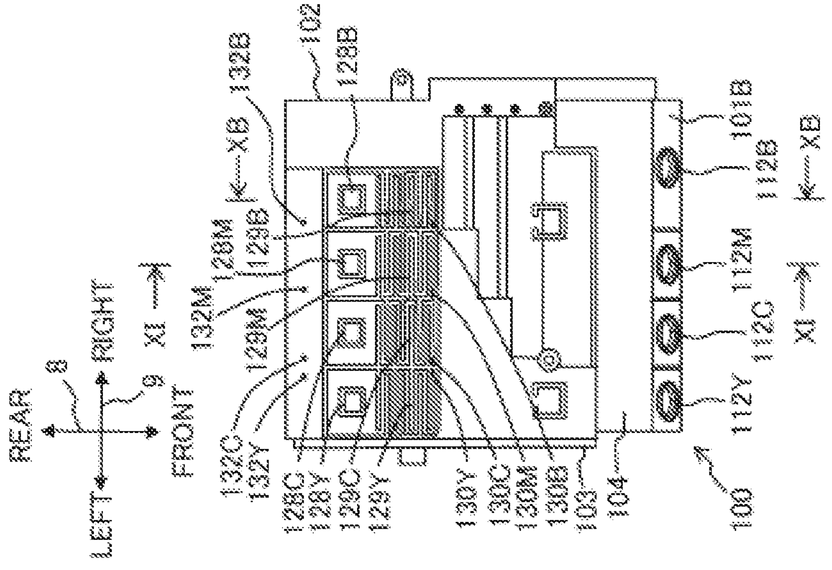
FIG. 10A is a plan view of the ink tank 100.

Atmosphere communicating channels 126B, 126M, 126C, and 126Y (hereinafter, collectively referred to as 'atmosphere communicating channel 126') are connected to the ink chambers 111 as depicted in FIG. 10. The atmosphere communicating channel 126 makes the corresponding ink chamber 111 communicate with the atmosphere. More elaborately, the atmosphere communicating channel 126 communicates with the corresponding ink chamber 111 through a notch 127 and communicates with an exterior of the ink tank 100 through the opening 132. Moreover, the atmosphere communicating channel 126 makes air inflow and outflow between the ink chamber 111 and the exterior of the ink tank 100 through the notch 127, a first through hole 128, a labyrinth 129, a second through hole 130, a gas passage 131, and an opening 132.

The notch 127 is provided at an upper side of the center in the up-down direction 7 of the corresponding ink chamber 111, at a rear side of the center in the front-rear direction 8, and at a left side of the center in the left-right direction 9. More elaborately, the notch 127B is demarcated by the upper wall 104, the film 106, and the partition wall 107. The notch 127M is demarcated by the upper wall 104, the film 106, and the partition wall 108. The notch 127C is demarcated by the upper wall 104, the film 106, and the partition wall 109. The notch 127Y is demarcated by the upper wall 104, the film 106, and the left wall 103. In other words, the notch 127 in the present embodiment is provided at an upper end, a rear end, and a left end of the corresponding ink chambers 111.

Moreover, a semipermeable film 133 is applied to the first through hole 128. The semipermeable film 133 is a porous film having micro holes, which blocks passing of an ink through it and allows a gas to pass through. As the semipermeable film 133, a porous film which is made of a fluoro-resin such as, polytetrafluoroethylene, polychlorotrifluoroethylene, tetrafluoroethylene-hexafluoropropylene copolymer, tetrafluoroethylene-perfluoroalkyl vinyl ether copolymer, and tetrafluoroethylene-ethylene copolymer can be used. Furthermore, an upper side of the first through hole 128, the labyrinth 129, and the second through hole 130 is covered by a film 134.

<Partition Wall 135>

As depicted in FIGS. 7, 9A, and 9B), the interior of the ink chamber 111 is provided with partition walls 135B, 135M, 135C, and 135Y (hereinafter, collectively referred to as 'partition wall 135') spread in the front-rear direction 8 and the left-right direction 9. The partition wall 135 in the present embodiment is extended in a substantially horizontal direction. However, the partition wall 135 is not restricted to be extended only in the horizontal direction. For instance, the partition wall 135 may be inclined downward toward rear side in the front-rear direction 8.

The partition wall 135B is connected to the erected wall 101A, the right wall 102, the film 106, and the partition wall 107. The partition wall 135M is connected to the erected wall 101A, the film 106, and the partition walls 107 and 108. The partition wall 135C is connected to the erected wall 101A, the film 106, and the partition walls 108 and 109. The partition wall 135Y is connected to the erected wall 101A, the left wall 103, the film 106, and the partition wall 109. In other words, the partition wall 135 is provided at a lower side of the inlet 112 at the interior of the ink chamber 111. Moreover, the partition wall 135 divides a part of the corresponding ink chamber 111 in the up-down direction 7. In other words, the partition wall 135 is isolated from the upper wall 104 and the lower wall 105, and there is a space on the upper side and the lower side in the up-down direction 7 of the partition wall 135. A shape of the partition walls 135B, 135M, 135C, and 135M are substantially same. The partition wall 135M will be described below in detail by referring to FIGS. 11 and 12.

Figure 11:
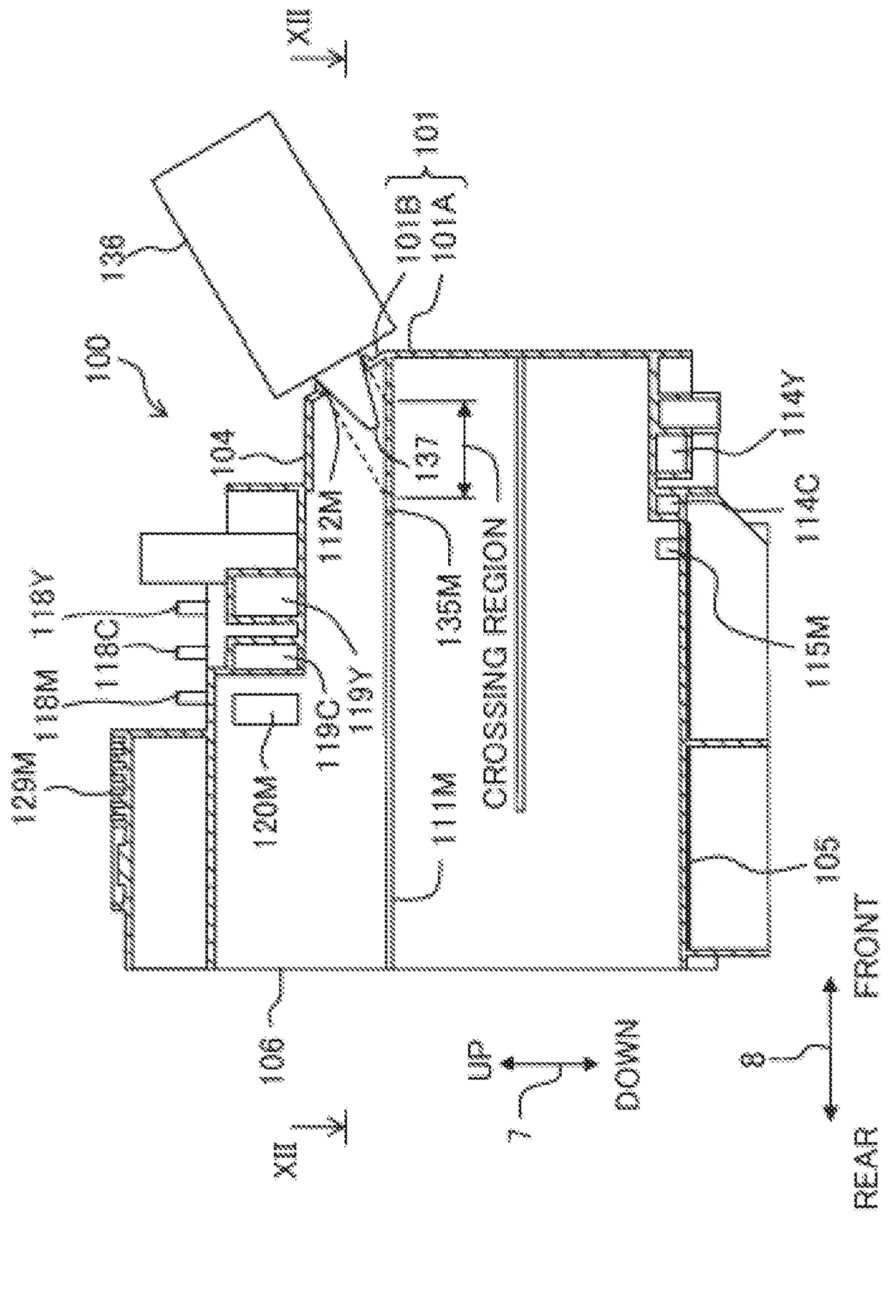
FIG. 11 is a cross-sectional view along a line XI-XI in FIG. 10A.

As depicted in FIG. 11, the partition wall 135M is provided at least to a crossing region or a crossing area. As an example, the crossing region can be defined as a region that intersects a virtual line (broken lines in FIG. 11) passing through the inlet 112M and orthogonal to the inclined wall 101B. As another example, the crossing region can be defined as a region passing through the inlet 112M, and intersecting a virtual line extended in a direction of passing through the inlet 112M. As still another example, the crossing region can be defined as a region intersecting a direction of outflow of an ink that is outflowed from a supply port 137 of an ink bottle 136 (an example of a liquid supply container) that has been positioned upon entering into (positioned immediately after an entrance of) the ink chamber 111M through the inlet 112M. In other words, the partition wall 135M is provided in an area through which the ink that inflows into the ink chamber 111M through the inlet 112M passes. In other words, a majority of portion of the ink refilled into the ink chamber 111M through the inlet 112M hits or strikes the partition wall 135M.

Figure 12:
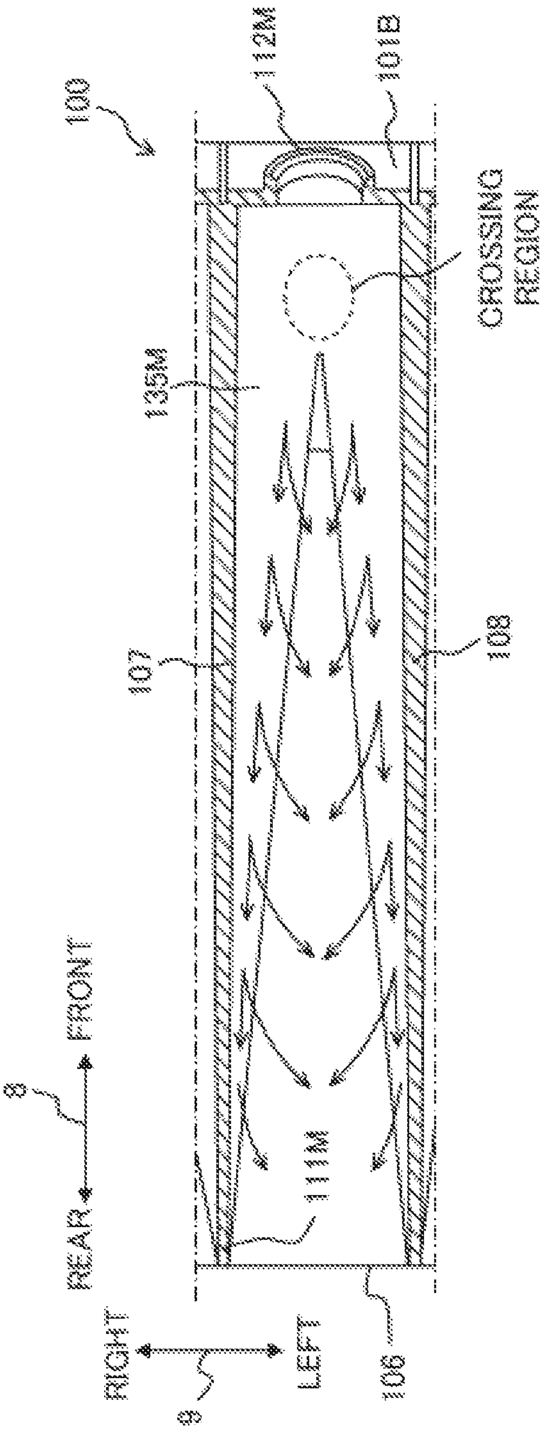
FIG. 12 is a cross-sectional view along a line XII-XII in FIG. 11.

Moreover, as depicted in FIG. 12, the partition wall 135M is provided in an entire area on a frontward side in the front-rear direction 8 of the crossing region. In other words, the partition wall 135M is provided in an entire area on a side near the inlet 112M in the horizontal direction. In other words, the partition wall 135 is extended continuously without any gap in the erected area 101A and the partition walls 107 and 108 at a frontward side of the crossing region. In other words, the partition wall 135M divides the ink chamber 111M in the up-down direction 7 in the entire area at the frontward side of the crossing region. Moreover, the partition wall 135M is also extended toward a rearward side in the front-rear direction 8 of the crossing region (in other words, a side far away from the inlet 112 in the horizontal direction). However, a part of the partition wall 135M on the rearward side of the crossing region is opened. An area of an opening (in an example in FIG. 12, a width of the opening in the left-right direction 9) provided to the partition wall 135M goes on becoming larger toward a position farther away from the inlet 112M. Moreover, a shape of the opening is symmetrical with respect to a direction of moving away from the inlet 112M along the partition wall 135M (in other words, a rear side of the front-rear direction 8). The shape of the opening in the present embodiment is an isosceles triangle with a vertex directed frontward.

<Arrangement of Ink Tank 100>

The ink tank 100 having the abovementioned arrangement, as depicted in FIG. 2, is arranged at a lower side of a lower surface (in other words, the nozzle surface) of the carriage 23. More elaborately, an inner surface of the upper wall 104 that demarcates the upper surface of the ink chamber 111 (in other words, a top surface of the ink chamber 111) is positioned at a lower side of the nozzle surface. Even more elaborately, a lower end of the inlet 112 is positioned at a lower side of the nozzle surface. In other words, the liquid level of the ink inside the ink chamber 111 which is in a usable state is positioned at a lower side of the nozzle surface. Moreover, as depicted in FIGS. 2 and 3, the ink tank 100 is arranged at a front in the front-rear direction 8 of the guide rail 44, the carriage 23, and the nozzle 40, or in other words, is arranged at a position shifted forward (an example of a first direction). More elaborately, the film 106 which demarcates a rear surface of the ink chamber 111 is positioned in front of the nozzles 40.

Moreover, as depicted in FIG. 3, the ink tank 100 is arranged at a position shifted to right in the left-right direction 9 of the conveyance route 65, or in other words, toward rightward side (an example of a second direction). More elaborately, an inner surface of the left wall 103 which demarcates a left surface of the ink chamber 111Y is arranged at a right side of the conveyance route 65. In other words, all the ink chambers 111 are arranged at the right side of the conveyance route 65. Furthermore, at least a part of the ink outflow channel 114 or the ink lead-out channel 117 is positioned at a further right side of the nozzles 40 of the carriage 23 (depicted by alternate long and short dash lines in FIG. 3). In other words, the ink that outflows from the ink chamber 111 passes on the right side of the nozzles 40, and is supplied to the recording head 39.

Technical Effect of Present Embodiment

According to the embodiment, even when the posture of the multi function peripheral 10 is changed, the ink inside the ink chamber 111 is either positioned at the lower side of the nozzles 40, or is positioned at the lower side of a position at which the ink chamber 111 and the ink outflow channel 114 are connected (in other words, a position of the opening 115). As a result, it is possible to suppress the ink from being leaked due to the change in the posture of the multi function peripheral 10.

For example, when the lower end of the inlet 112 is positioned at the lower side of the nozzles 40 in the usable posture in which the lower surface of the multi function peripheral 10 is at the lower side of the upper surface (of the multi function peripheral 10), the liquid level in the ink chamber 111 is positioned at the lower side of the nozzles 40. As a result, it is possible to prevent the ink from being leaked from the nozzles 40 due to a water-head difference.

Moreover, in a posture in which the front surface of the multi function peripheral 10 is at the lower side of the rear surface (of the multi function peripheral 10), the liquid level in the ink chamber 111 which is positioned at the front side of the carriage 23 in the usable posture, is positioned at the lower side of the nozzles 40. Moreover, in a posture in which a right surface of the multi function peripheral 10 is at the lower side of a left surface of the multi function peripheral 10, even when the liquid level in the ink chamber 111 which is positioned at the right side of the transporting path 65 in the usable posture, is positioned at the lower side of the nozzles 40, or is positioned at the upper side of the nozzle 40, there is a little difference between the two. As a result, it is possible to suppress the ink from being leaked through the nozzle 40 due to the water-head difference.

Furthermore, in a posture in which the upper surface of the multi function peripheral 10 is at a lower side of the lower surface of the multi function peripheral 10, a posture in which the rear surface of the multi function peripheral 10 is at the lower side of the front surface of the multi function peripheral 10, and a posture in which the left surface of the multi function peripheral 10 is at the lower side of the right surface of the multi function peripheral 10, the liquid level in the ink chamber 111 is positioned at the lower side of the position of the opening 115. Accordingly, it is possible to suppress the ink inside the ink chamber 111 from outflowing to the ink outflow channel 114.

Moreover, according to the embodiment, the opening 116 is provided at the position in FIG. 8. Therefore, it is possible to suppress the ink inside the ink chamber 111 from flowing into the ink lead-out channel 117 in the following postures, that is, in the posture in which the upper surface of the multi function peripheral 10 is at the lower side of the lower surface of the multi function peripheral 10, in the posture in which the rear surface of the multi function peripheral 10 is at the lower side of the front surface of the multi function peripheral 10, and in the posture in which the left surface of the multi function peripheral 10 is at the lower side of the right surface of the multi function peripheral 10. Furthermore, because the opening 116B is positioned at the extreme front, it is possible to reduce further a possibility of the ink inside the ink chamber 111B having a large volume flowing into the ink lead-out channel 117B.

Moreover, in the usable posture of the multi function peripheral 10, the opening 120 which is at the other end of the return channel 119 is positioned at a lower side in the up-down direction 7 of the opening 116 which is one end of the return channel 119. Accordingly, as the posture assumed is the posture in which the upper surface of the multi function peripheral 10 is at the lower side of the lower surface of the multi function peripheral 10, the opening 116 is positioned at the upper side of the opening 120, and air that was present inside the return channel 119 can reach the opening 116. As the air reaches the opening 116, the ink inside the ink outflow channel 114 and the ink inside the ink lead-out channel 117 are isolated by the air. Moreover, in the usable posture of the multi function peripheral 10, the opening 116 is provided at a position at a lower side of the center in the up-down direction 7 of the ink tank 100. Accordingly, as the posture assumed is the posture in which, the upper surface of the multi function peripheral 10 is at the lower side of the lower surface of the multi function peripheral 10, the ink inside the ink outflow channel 114 that was isolated from the ink inside the ink lead-out channel 117 returns to the ink chamber 111 through the opening 115. Consequently, it is possible to suppress the ink inside the ink chamber 111 from flowing into the ink lead-out channel 117.

Similarly, the opening 120 which is the other end of the return channel 119, in the usable posture of the multi function peripheral 10, is positioned at a rear side in the front-rear direction 8 of the opening 116 which is the one end of the return channel 119. Accordingly, as the posture assumed is a posture in which the rear surface of the multi function peripheral 10 is at the lower side of the front surface of the multi function peripheral 10, the opening 116 is positioned at the upper side of the opening 120, and the air that was present inside the return channel 119 can reach the opening 116. As the air reaches the opening 116, the ink inside the ink outflow channel 114 and the ink inside the ink lead-out channel 117 are isolated by the air. Moreover, in the usable posture of the multi function peripheral 10, the opening 116 is provided at a position in front of the center in the front-rear direction 8 of the ink tank 100. Accordingly, as the posture assumed is a posture in which the rear surface of the multi function peripheral 10 is at the lower side of the front surface of the multi function peripheral 10, the ink inside the ink outflow channel 114 that was isolated from the ink inside the ink lead-out channel 117 returns to the ink chamber 111 through the opening 115. Consequently, it is possible to suppress the ink inside the ink chamber 111 from flowing into the ink lead-out channel 117.

Similarly, in the usable posture of the multi function peripheral 10, the opening 120 which is the other end of the return channel 119 is positioned at a left side in the left-right direction 9 of the opening 116 which is the one end of the return channel 119. Accordingly, as the posture assumed is a posture in which the left surface of the multi function peripheral 10 is at the lower side of the right surface of the multi function peripheral 10, the opening 116 is positioned at the upper side of the opening 120, and the air that was present inside the return channel 119 can reach the opening 116. As the air reaches the opening 116, the ink inside the ink outflow channel 114 and the ink inside the ink lead-out channel 117 are isolated by the air. Moreover, in the usable posture of the multi function peripheral 10, the opening 116 is provided to a right side surface of the ink tank 100. Accordingly, as the posture assumed is a posture in which the left surface of the multi function peripheral 10 is at the lower side of the right surface, the ink inside the ink outflow channel 114 that was isolated from the ink inside the ink lead-out channel 117 returns to the ink chamber 111 through the opening 115. Consequently, it is possible to suppress the ink inside the ink chamber 111 from flowing into the ink lead-out channel 117.

Moreover, according to the embodiment, in the posture in which the upper surface of the multi function peripheral 10 is at the lower side of the lower surface of the multi function peripheral 10, the posture in which the rear surface of the multi function peripheral 10 is at the lower side of the front surface of the multi function peripheral 10, and the posture in which the left surface of the multi function peripheral 10 is at the lower side of the right surface of the multi function peripheral 10, the ink inside the ink chamber 111 easily reaches a position at which the ink chamber 111 and the atmosphere communicating channel 126 are connected (in other words, a position of the notch 127). Accordingly, since inflow of the atmosphere into the ink chamber 111 is inhibited, it is possible to suppress further the ink inside the ink chamber 111 from outflowing to the ink outflow channel 114. On the other hand, the liquid level in the ink chamber 111 is positioned at the lower side of the position of the notch 127, in the usable posture of the multi function peripheral 10, in the posture in which the front surface of the multi function peripheral 10 is at the lower side of the rear surface of the multi function peripheral 10, and in the posture in which the right surface of the multi function peripheral 10 is at the lower side of the left surface of the multi function peripheral 10. Accordingly, since the ink chamber 111 communicates with the atmosphere, it is possible to suppress the ink inside the ink chamber 111 from being pushed to the ink outflow channel 114 due to rise in an internal pressure of the ink chamber 111 due to a change in temperature or a change in altitude.

Moreover, according to the embodiment, since the upper surface of the lower wall 105 which forms the bottom surface of the ink chamber 111 is inclined downward toward the right side, in the usable posture of the multi function peripheral 10, the ink inside the ink chamber 111 is susceptible to reach the position of the opening 115. On the other hand, according to the embodiment, since the partition wall 110 is provided at the upper side of the opening 115B, in a posture in which the upper surface of the multi function peripheral 10 is at the lower side of the lower surface of the multi function peripheral 10, it is possible to reduce a possibility of the ink inside the ink chamber 111B reaching the position of the opening 115B due to a fluctuation in the liquid level caused due to vibration etc.

The position of the partition wall 110 is not restricted to be at the upper side of the opening 115B, and may be arranged at the right side or at the rear side of the opening 115B. Accordingly, in the posture in which the left surface of the multi function peripheral 10 is at the lower side of the right surface of the multi function peripheral 10, and in the posture in which the rear surface of the multi function peripheral 10 is at the lower side of the front surface of the multi function peripheral 10, it is possible to reduce the possibility of the ink inside the ink chamber 111B reaching the position of the opening 115B due to the fluctuation in the liquid level caused due to vibration etc. In other words, it is preferable to provide the partition wall 110 to be intersecting the direction of inflow of ink into the opening 115B at least at one of the upper side, the right side, and the rear side of the opening 115B. Moreover, the partition wall 110, without restricting to the ink chamber 111B, may be provided in an area around the openings 115M, 115C, and 115Y of the ink chambers 111M, 111C, and 111Y respectively.

Moreover, as depicted in FIG. 13, a volume of the ink chamber 111 may be let to be deviated or biased in one of the up-down direction 7, the front-rear direction 8, and the left-right direction 9. Only examples of shapes of the ink chamber 111B are depicted in FIG. 13A, FIG. 13B, and FIG. 13C, and it is needless to say that the shapes depicted in FIGS. 13A to 13C may be applied to the other ink chambers 111M, 111C, and 111Y.

For example, as depicted in FIG. 13A, the volume of the upper side of the center in the up-down direction 7 of the ink chamber 111B may be let to be larger than the volume of the lower side of the center in the up-down direction 7 of the ink chamber 111B. Accordingly, in the posture in which the upper surface of the multi function peripheral 10 is at the lower side of the lower surface of the multi function peripheral 10, it is possible to reduce a possibility of the ink inside the ink chamber 111B reaching the position of the opening 115B. Moreover, as depicted in FIG. 13B, the volume of the rear side of the center in the front-rear direction 8 of the ink chamber 111B may be let to be larger than the volume of the front side of the center in the front-rear direction 8 of the ink chamber 111B. Accordingly, in the posture in which the rear surface of the multi function peripheral 10 is at the lower side of the front surface of the multi function peripheral 10, it is possible to reduce a possibility of the ink inside the ink chamber 111B reaching the position of the opening 115B. Furthermore, as depicted in FIG. 13C, the volume of the left side of the center in the left-right direction 9 of the ink chamber 111B may be let to be larger than the volume of the right side of the center in the left-right direction 9 of the ink chamber 111B. Accordingly, in the posture in which the left surface of the multi function peripheral 10 is at the lower side of the right surface of the multi function peripheral 10, it is possible to reduce a possibility of the ink inside the ink chamber 111B reaching the position of the opening 115B.

Moreover, in the multi function peripheral 10 according to the embodiment, at the time of refilling the ink to each ink chamber 111 for the first time, there is a possibility that the entire distribution channel (circulation route) of the ink from the ink chamber 111 up to the recording head 39 (in other words, the ink outflow channel 114, the ink lead-out channel 117, and the ink tube 32) is not filled with the ink. Therefore, a so-called initial purge in which the ink is jetted to the recording head 39 till the entire distribution channel is filled with the ink, may be carried out. Here, the volume of each ink lead-out channel 117 and the volume of each ink tube 32 is substantially same, and the volume of each ink outflow channel 114 differs.

The return channel 119 is provided to the ink tank 100. Therefore, as the ink is refilled into the ink chamber 111 through the inlet 112, with the ink entering into the ink outflow channel 114, the air inside the ink outflow channel 114 is pushed to the ink chamber 111 through the return channel 119. Moreover, the air inside the ink chamber 111 is discharged into the atmosphere through the atmosphere communicating channel 126. Accordingly, it is possible to make the ink refilled into the ink chamber 111 reach the position of the opening 116. As a result, even when the volume of each ink outflow channel 114 between the opening 115 and the opening 116 differs, it is possible to suppress a deviation bias in an amount of consumption of the ink in the initial purge. Moreover, according to the embodiment, since the opening 116 is positioned in the same surface of the ink tank 100, it becomes easy to make lengths of ink channels from a position of each opening 116 up to the recording head 39 same. As a result, it is possible to standardize further the amount of consumption of ink in each ink chamber 111 in the initial purge.

Moreover, according to the embodiment, it is possible to circulate a gas passing through the ink outflow channel 114 in the ink chamber 111 through the return channel 119 by the ink lead-out channel 117 connected to a lower portion of the opening 116, and by the return channel 119 connected to an upper portion of the opening 116. As a result, when the ink is jetted from the recording head 39 after the initial purge, it is possible to suppress the gas from being supplied to the recording head 39 through the ink lead-out channel 117. Moreover, by letting the channel resistance of the return channel 119 to be higher than the channel resistance of the ink outflow channel 114, it is possible to suppress the gas in the return channel 119 from entering into the ink lead-out channel 117. Furthermore, the maximum amount of the ink to be outflowed per unit time through the ink outflow channel 114 is set to be larger than the maximum amount of the ink jetted per unit time through the recording head 39. Therefore, when the ink is jetted from the recording head 39 after the initial purge, it is possible to suppress the air in the ink chamber 111 from being supplied to the recording head 39 through the ink outflow channel 114 and the ink lead-out channel 117.

Moreover, in the ink tank 100 according to the embodiment, the ink refilled into the ink chamber 111 through the inlet 112 drops down on the lower portion of the ink chamber 111 upon hitting the partition wall 135. As a result, since the force of the ink refilled is diminished, it is possible to suppress generation of air bubbles from the ink that collides with the bottom surface of the ink chamber 111. In the present embodiment, there exists no channel between the inlet 112 and the ink chamber 111. Consequently, the ink outflowed from the supply port 137 of the ink bottle 136, without making a contact with a wall surface of a channel etc. is refilled directly into the ink chamber 111 with the same force or vigor. However, since the force of the ink is diminished by the partition wall 135 as mentioned above, it is possible to suppress the generation of air bubbles. Moreover, since the ink chamber 111 has been divided in the up-down direction 7 through the entire area on the front side of the crossing region, even when the liquid level inside the ink chamber 111 rises up in a state of the air bubbles generated in the ink chamber 111, it is possible to suppress the air bubbles from being overflowed through the inlet 112.

Smaller the area of an opening formed in the partition wall, easier it is to suppress effectively the air bubbles from reaching at an upper side of the partition wall 135. However, when the area of the opening is excessively small, the air bubbles are not susceptible to escape to a lower side of the partition wall 135, and it becomes difficult to fill up the ink chamber 111 with the ink. Therefore, as in the embodiment, by making the area of the opening larger as moving farther from the inlet 112, at a position near the inlet 112, it is possible to suppress the air bubbles from reaching the upper side of the partition wall 135. On the other hand, at a position distant from the inlet 112, it is possible to distribute the air smoothly between the lower side and the upper side of the partition wall 135 through the opening.

Moreover, as depicted in FIG. 11, the ink outflowed through the supply port 137 of the ink bottle 136 inserted into the inlet 112 has a velocity even in the horizontal direction. Therefore, as depicted by arrows in FIG. 12, the ink that has hit the partition wall 135 moves rearward on the partition wall 135, and drops to the lower portion of the ink chamber 111 through the opening at different positions in the front-rear direction 8. Therefore, by letting the partition wall 135 have a shape as depicted in FIG. 11 and FIG. 12, it is possible to reduce evenly the velocity of ink moving on the partition wall 135.

Moreover, according to the embodiment, with the rise in the liquid level inside the ink chamber 111B (in other words, with the replenishment of ink through the inlet 112B), the ink inflows into the additional ink chamber 123 through the through hole 123A. With the fall of the liquid level inside the ink chamber 111B (in other words, with the jetting of the ink by the recording head 39), the ink outflows from the additional ink chamber 123 through the through hole 123A. Therefore, by detecting the presence or absence of ink in the detection portion 124 by the optical sensor 125 provided to the additional ink chamber 123, it is possible to know an amount of ink remained in the ink chamber 111B.

The black ink which is used largely in the multi function peripheral 10 is stored in the ink chamber 111B having a large volume. Therefore, by knowing the amount of ink remained in the ink chamber 111B by using the optical sensor 125, it is possible to urge a refilling of the ink to the user before the black ink is completely exhausted. As a result, it is possible to suppress a degradation of an operation rate of the multi function peripheral 10. However, the amount of ink remained not only in the ink chamber 111B, but also in each of the ink chambers 111M, 111C, and 111Y may be detected.

For example, as depicted in FIG. 14, first receiving units 138M, 138C, and 138Y (hereinafter, collectively referred to as 'first receiving unit 138'), and second receiving units 139M, 139C, and 139Y (hereinafter, collectively referred to as 'second receiving unit 139') facing mutually in the front-rear direction 8 and sandwiching the return channels 119M, 119C, and 119Y respectively may be formed in the right wall 102 of the ink tank 100. The light emitting unit 125A of the optical sensor 125 is inserted into the first receiving unit 138. The light receiving unit 125B of the optical sensor 125 is inserted into the second receiving unit 139. Accordingly, the light emitting unit 125A and the light receiving unit 125B are facing mutually, sandwiching the return channel 119. Moreover, light output from the light emitting unit 125A is transmitted through the projected walls 121B, 121C, 121D, 121E, 121F, and 121G which demarcate the return channel 119, and is not transmitted through the magenta ink, the cyan ink, and the yellow ink.

The liquid level inside the return channels 119M, 119C, and 119Y coincide substantially with the liquid level in the corresponding ink chambers 111M, 111C, and 111Y Therefore, by detecting a position of the liquid level in each return channel 119M, 119C, and 119Y, it is possible to know the amount of ink remained in the ink chambers 111M, 111C, and 111Y Accordingly, since it is possible to urge a refilling of the ink to the user before the ink in the ink chambers 111M, 111C, and 111Y is completely exhausted, the operation rate of the multi function peripheral 10 is suppressed from being degraded.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the embodiment, an example in which the ink tank 100 is arranged at a position shifted to front side in the front-rear direction 8 of the nozzles 40, and shifted to right in the left-right direction 9 of the conveyance route 65 in the multi function peripheral 10, has been described. However, the position of the ink tank 100 is not restricted to the position in the example. For instance, as depicted in FIG. 15, even when the ink tanks 100A, 100B, and 100C are arranged at a left-front side, a right-rear side, or a left-rear side, an effect similar to the effect of the embodiment can be anticipated. Description of points common to the embodiment will be omitted. Moreover, it is omitted in the diagram, but a position of the opening 22 and a position of the cover 70 are also to be moved according to positions of the ink tanks 100A, 100B, and 100C.

For instance, the ink tank 100A which is arranged at a position shifted to front side in the front-rear direction 8 of the nozzles 40, and shifted to left side in the left-right direction 9 of the conveyance route 65, as compared to the ink tank 100, has a positional relationship of components having left side and right side reversed, with respect to a plane passing through the center in the left-right direction 9 of the ink tank 100 and parallel to the up-down direction 7 and the front-rear direction 8. In other words, the ink tank 100A is a mirror image of the ink tank 100 with respect to the plane passing through the center in the left-right direction 9 of the ink tank 100 and parallel to the up-down direction 7 and the front-rear direction 8. Concretely, the ink chamber 111 is arranged in order of the ink chambers 111B, 111M, 111C, and 111Y from the left side toward the right side. Moreover, the opening 116, the ink lead-out channel 117, and the return channel 119 etc. are formed in the left side surface of the ink tank 100 (in other words, the outer surface of the left wall 103).

Moreover, the ink tank 100B which is arranged at a position shifted to rear side in the front-rear direction 8 of the nozzles 40, and shifted to right side in the left-right direction 9 of the conveyance route 65, has a shape same as the shape of the ink tank 100A, and is arranged with the front side and the reverse side reversed (in other words, directed toward rear side of the front wall 101). Moreover, the ink tank 100C which is arranged at a position shifted to rear side in the front-rear direction 8 of the nozzles 40, and shifted to left side in the left-right direction 9 of the conveyance route 65 has a shape same as the shape of the ink tank 100, and is arranged with the front side and the reverse side reversed (in other words, directed toward rear side of the front wall 101).

Moreover, in the embodiment, the recording section 24 was positioned at an upper side in the up-down direction 7 with respect to the overall conveyance route 65 from the feeding tray 20 up to the discharge tray 21. However, the position of the recording section 24 is not restricted to the position in the embodiment. In other words, the recording section may be positioned at an upper side in the up-down direction 7 with respect to a part of the conveyance route 65 facing the recording section 24 in the up-down direction 7. For example, the feeding tray 20 may be arranged at the upper side in the up-down direction 7 of the recording section 24, and the transporting path 65 may be extended to be directed (inclined) downward from the feeding tray 20 toward a space between the recording section 24 and the platen 42.

Furthermore, the ink has been described as an example of a liquid. However, the present teaching is not restricted to ink as a liquid. In other words, instead of ink, a pretreatment liquid which is to be jetted on to a recording paper before jetting an ink at the time of printing, or, water which is to be sprayed in the vicinity of the nozzles 40 of the recording head 39 for preventing drying of the nozzles 40 of the recording head 39 may be let to the liquid.

What is claimed is:

1. A tank, comprising:

a liquid storage chamber configured to store a liquid; and an outlet configured to allow the liquid stored in the liquid storage chamber to flow out, wherein the liquid storage chamber includes a base portion and a protruding portion, the base portion includes a first lateral wall and a second lateral wall which faces the first lateral wall in a front-rear direction, the protruding portion protrudes from the second lateral wall of the base portion in a direction away from the first lateral wall in the front-rear direction, and the front-rear direction is defined based on a usable posture in which the tank is disposed such that a lower surface of the liquid storage chamber is located below an upper surface of the liquid storage chamber, and a distance between the outlet and the second lateral wall in the front-rear direction is smaller than a distance between the outlet and the first lateral wall in the front-rear direction.

2. The tank according to claim 1, wherein a volume of one side of a center in the front-rear direction of the liquid storage chamber is smaller than a volume of another side of the center in the front-rear direction of the liquid storage chamber, and the second lateral wall is located at the one side with respect to the first lateral wall in the front-rear direction.

3. The tank according to claim 1, wherein the protruding portion of the liquid storage chamber is configured to store a part of the liquid.

4. The tank according to claim 1, further comprising an inlet configured to allow the liquid to flow into the liquid storage chamber, wherein the protruding portion includes the inlet.

5. The tank according to claim 2, wherein the protruding portion includes a third lateral wall defining the liquid storage chamber in the front-rear direction, and a volume of the one side, of the liquid storage chamber, from a center between the first lateral wall and the third lateral wall in the front-rear direction is smaller than a volume of the other side, of the liquid storage chamber, from the center between the first lateral wall and the third lateral wall in the front-rear direction.

6. The tank according to claim 5, further comprising an inlet configured to allow the liquid to flow into the liquid storage chamber, wherein the inlet is between the first lateral wall and the third lateral wall.

7. The tank according to claim 6, wherein the third lateral wall is located in front of the inlet.

* * * * *